(12) United States Patent  
Yoshida et al.

(10) Patent No.: US 7,786,790 B2  
(45) Date of Patent: Aug. 31, 2010

(54) TEMPERATURE COMPENSATION CIRCUIT

(75) Inventors: Naoki Yoshida, Suwa (JP); Masahiro Kanai, Suwa (JP); Asami Kobayashi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/407,390

(22) Filed: Mar. 19, 2009

(65) Prior Publication Data

US 2009/0237151 A1    Sep. 24, 2009

(30) Foreign Application Priority Data

Mar. 21, 2008    (JP) .............................. 2008-073130

(51) Int. Cl.
 *H01L 35/00*    (2006.01)
(52) U.S. Cl. ....................................... 327/513; 327/539
(58) Field of Classification Search ................. 327/512, 327/513, 534, 535, 537, 539
See application file for complete search history.

(56) References Cited

U.S. PATENT DOCUMENTS

| 5,034,629 | A | * | 7/1991 | Kinugasa et al. ............... 326/27 |
| 5,818,294 | A | * | 10/1998 | Ashmore, Jr. ................ 327/543 |
| 6,744,304 | B2 | * | 6/2004 | Egerer et al. ................. 327/540 |
| 7,224,210 | B2 | * | 5/2007 | Garlapati et al. ............ 327/539 |

FOREIGN PATENT DOCUMENTS

JP    A-2001-267848    9/2001

* cited by examiner

Primary Examiner—Jeffrey S Zweizig  
(74) Attorney, Agent, or Firm—Oliff & Berridge, PLC

(57) ABSTRACT

A temperature compensation circuit performing temperature compensation of an analog reference voltage, includes: a first reference voltage generating circuit generating a first voltage of which a voltage level varies depending on a temperature; a second reference voltage generating circuit generating a second voltage of which a voltage level is independent of a temperature and having a circuit configuration that is same as a circuit configuration of the first reference voltage generating circuit; an inverting amplifier having a gain of 1, which inverts and amplifies a voltage difference between the first voltage and the second voltage so as to generate a third voltage; and a differential amplifier amplifying a voltage difference between the third voltage and the first voltage so as to generate a fourth voltage In the temperature compensation circuit, the differential amplifier includes: a first operational amplifier; a first resistor coupled between a first node and a second node that is an inverting input terminal of the first operational amplifier; a second resistor coupled between a third node and a fourth node that is a non-inverting input terminal of the first operational amplifier; a third resistor coupled between the second node and a fifth node that is an output node of the first operational amplifier; and a fourth resistor coupled between the fourth node and a sixth node to which an analog reference voltage is applied. Further, in the circuit, resistance values of the first resistor and the second resistor are set to be same as each other, and resistance values of the third resistor and the fourth resistor are set to be same as each other.

9 Claims, 11 Drawing Sheets

TEMPERATURE COMPENSATION CIRCUIT

This application claims priority from Japanese Patent Application No. 2008-073130 filed in the Japanese Patent Office on Mar. 21, 2008, the entire disclosure of which is hereby incorporated by reference in its entirety.

BACKGROUND

1. Technical Field

The present invention relates to a temperature compensation circuit (a temperature compensation voltage generating circuit) and the like.

2. Related Art

An analog reference voltage (a direct current bias voltage) on a signal path (or a circuit) varies depending on an ambient temperature. If the variation of the analog reference voltage is compensated with high accuracy, sensing accuracy of a sensing circuit that detects physical quantity, for example, can be improved.

JP-A-2001-267848, for example, discloses a temperature compensation circuit. JP-A-2001-267848 discloses an oscillator (a temperature compensation type oscillator) provided with the temperature compensation circuit (a temperature compensation voltage generating circuit).

Characteristics of elements formed in an integrated circuit device (IC) vary in accordance with variations of element sizes, variations of conditions of a manufacturing process, or an environmental temperature (an ambient temperature). Further, since a noise is superimposed along the signal path, an adverse effect of the noise can not be ignored. Thus, it is difficult to generate a voltage that is temperature-compensated with substantially high accuracy by the temperature compensation circuit.

Further, in a case of temperature compensation of an analog reference voltage (a direct current bias voltage) AGND (analog ground) on the signal path (or a circuit), a temperature compensation voltage VTS that is highly accurate is generated so as to be added to the analog reference voltage AGND. That is, when a temperature-compensated reference voltage (also referred to as a temperature-compensated voltage) is denoted as Vtemp, Vtemp=AGND+VTS is satisfied. Namely, the temperature compensation circuit is required to generate the temperature compensation voltage VTS that is highly accurate for the analog reference voltage AGND.

In related art, a circuit itself has a temperature characteristic, and characteristics of the circuit vary in accordance with variations of element sizes or variations of a manufacturing process. Further, since a noise is superimposed along the signal path, an adverse effect of the noise can not be ignored. Therefore, it is difficult to generate the temperature compensation voltage VTS that is highly accurate. Further, in order to obtain the temperature-compensated voltage Vtemp, the temperature compensation voltage VTS that is generated needs to be superposed on the analog reference voltage AGND. There is no circuit that performs the superimposition of the voltages (addition of the voltages) with high accuracy in an efficient manner, in related art. Thus, the temperature-compensated voltage (Vtemp), described above, can not be generated with substantially high accuracy in an efficient manner.

The temperature characteristic of the circuit is variable. Therefore, in circuit designing, it is desired that the temperature characteristic of the temperature-compensated voltage (Vtemp) can be flexibly changed in a manner corresponding to the temperature characteristic of the circuit. Related art does not have such flexible temperature compensation circuit. Thus, it is difficult to realize a temperature compensation circuit that is capable of compensating variable temperature characteristics of the circuit and has high adaptability.

SUMMARY

The present invention is based on such perception. An advantage of the present invention is to provide a temperature compensation circuit that can realize temperature compensation of an analog reference voltage (e.g., analog ground), for example, with substantially high accuracy.

A temperature compensation circuit, according to an aspect of the invention, that performs temperature compensation of an analog reference voltage includes: a first reference voltage generating circuit generating a first voltage of which a voltage level varies depending on a temperature; a second reference voltage generating circuit generating a second voltage of which a voltage level is independent of a temperature and having a circuit configuration that is same as a circuit configuration of the first reference voltage generating circuit; an inverting amplifier having a gain of 1, which inverts and amplifies a voltage difference between the first voltage and the second voltage so as to generate a third voltage; and a differential amplifier amplifying a voltage difference between the third voltage and the first voltage so as to generate a fourth voltage. In the circuit, the differential amplifier includes: a first operational amplifier; a first resistor coupled between a first node and a second node that is an inverting input terminal of the first operational amplifier; a second resistor coupled between a third node and a fourth node that is a non-inverting input terminal of the first operational amplifier; a third resistor coupled between the second node and a fifth node that is an output node of the first operational amplifier; and a fourth resistor coupled between the fourth node and a sixth node to which an analog reference voltage is applied. Further, resistance values of the first resistor and the second resistor are set to be same as each other, and resistance values of the third resistor and the fourth resistor are set to be same as each other.

The two reference voltage generating circuits that have uniform characteristics generate the first voltage (a voltage V(BGR1) in FIG. 7, for example) of which the voltage level depends on the temperature and the second voltage (a voltage V(BGR2), for example) of which the voltage level does not depend on the temperature. The first voltage (V(BGR1)) has a negative temperature coefficient, for example. Specifically, a characteristic of the voltage level with respect to the temperature is expressed by a linear function having a negative slope (that is, having a characteristic of a negative primary proportion with respect to the temperature).

Subsequently, the voltage difference between the first voltage (V(BGR1)) and the second voltage (V(BGR2)) is inverted and amplified by the inverting amplifier so as to generate the third voltage (a voltage VG having a positive temperature coefficient, for example) having a temperature characteristic opposite to that of the analog reference voltage (AGND). The two reference voltage generating circuits have the uniform characteristics, so that relative accuracy between the first voltage (V(BGR1)) and the second voltage (V(BGR2)) is high. If a voltage value of the first voltage (V(BGR1)) at room temperature (25 degrees centigrade, for example, that is same in the following description, though it is not limited to 25 degrees centigrade) is Va, a voltage value of the second voltage (V(BGR2)) is also Va at room temperature (25 degrees centigrade). Under room temperature (25 degrees centigrade) atmosphere, there is no difference between the first voltage (V(BGR1)) and the second voltage (V(BGR2)), whereby the voltage difference is 0. An output voltage (the third voltage VG) of the inverting amplifier has a voltage value of Va at room temperature (25 degrees centigrade) so as to be expressed (approximated) as a linear function passing through Va. Noises superimposed on two input voltages of the inverting amplifier are canceled out each other, so that a noise superimposed on the third voltage (VG) is small.

Here, the temperature compensation voltage (having a positive temperature coefficient, for example) needs to be added to the analog reference voltage (AGND) having a negative temperature coefficient, for example, so that the reference voltage of the circuit needs to be shifted from Va to AGND (substituting AGND for Va). This operation is performed by the differential amplifier.

The differential amplifier includes the operational amplifier and the first to fourth resistors, for example. To the non-inverting input terminal, for example, of the differential amplifier, the analog reference voltage (AGND) is inputted through the fourth resistor.

The differential amplifier inverts and amplifies the voltage difference between the first voltage (V(BGR1)) and the third voltage (VG) by a predetermined gain (the gain may be set to be variable), for example. As a result, the fourth voltage (a voltage VN, for example) is obtained. In a case where the resistance values of the first to fourth resistors are appropriately set, the fourth voltage that is an output of the differential amplifier is obtained by adding a voltage, which is obtained by multiplying the voltage difference between the first voltage ant the third voltage by α (α is an arbitrary integer), that is, VTS=α·{V(BGR1)−VG}, to the analog reference voltage (AGND). That is, when the fourth voltage is denoted as VN, VN=AGND+VTS is satisfied. Here, if the voltage VTS has a positive temperature coefficient and therefore can cancel the negative temperature coefficient of the analog reference voltage (AGND), the voltage VTS can be considered as a temperature compensation voltage That is, by adding the temperature compensation voltage VTS to the analog reference voltage (AGND), a compensated analog reference voltage (Vtemp) is obtained (in this case, the fourth voltage VN described above corresponds to the voltage Vtemp).

The temperature compensation circuit of the aspect generates the first and second voltages having high ratio accuracy by using the two reference voltage generating circuits that have the uniform characteristics (the band gap circuits, for example). Further, the temperature compensation circuit obtains the compensated analog reference voltage (temperature-compensated voltage, namely, the fourth voltage VN) by actively using a circuit having a differential configuration and amplifying the difference between the two input voltages. Therefore, a temperature characteristic of the fourth voltage (VN) can be controlled with high accuracy. Further, since noises are canceled out, a noise superimposed on the fourth voltage (VN) is small.

Under an adjusted configuration of the differential amplifier and an adjusted circuit condition, the fourth voltage (VN) outputted from the differential amplifier is obtained by adding a voltage, which has a positive polarity and is obtained by multiplying the voltage difference between the two input voltages by α, to an actual analog reference voltage (AGND). Thus, a circuit operation with the voltage AGND as a reference level is realized. Therefore, variation of the voltage level of the analog reference voltage (AGND) with respect to an ambient temperature can be compensated in circuit-wise (automatically) with high accuracy.

In addition, the temperature compensation circuit according to the aspect has a simplified configuration so as to be suitable for a manufacture of a high integrated IC.

In the temperature compensation circuit of the aspect, the first reference voltage generating circuit and the second reference voltage generating circuit may be respectively composed of a first band gap circuit and a second band gap circuit that have the same circuit configuration as each other except for resistance values of resistors used therein. Further, the first band gap circuit and the second band gap circuit may be manufactured by a common manufacturing process so as to be disposed adjacent to each other.

With the band gap circuits, temperature characteristics of the first voltage and the second voltage can be controlled with high accuracy. The common manufacturing process of the two band gap circuits can suppress manufacturing variation of the circuits. By employing a layout in which the two band gap circuits are disposed adjacent to each other, variation of circuit elements can be suppressed so as the circuits to be disposed in a corresponding manner on a chip. Thus, the ratio accuracy between the first and second voltages can be increased.

The temperature compensation circuit of the aspect further includes a variable gain amplifier that is provided on a next stage of the differential amplifier and amplifies the fourth voltage so as to output a fifth voltage. The variable gain amplifier includes: a second operational amplifier; a fifth resistor coupled between a seventh node and an eighth node that is an inverting input terminal of the second operational amplifier; a sixth resistor coupled between a ninth node that is a non-inverting input terminal of the second operational amplifier and a tenth node to which the analog reference voltage is applied; and a seventh resistor coupled between the eighth node and an eleventh node that is an output node of the second operational amplifier. At least one of the fifth resistor and the seventh resistor is a variable resistor of which a resistance value is variable.

When a case where a temperature characteristic of a circuit is compensated, the temperature-compensated voltage (Vtemp) may be required to have a desired temperature coefficient with respect to the temperature (to be sensitive with respect to the temperature) for some reason.

Therefore, the temperature compensation circuit of the aspect is provided with the variable gain amplifier so as to flexibly respond to such requirement. A slope of a characteristic line (segment) expressing the temperature characteristic of the fourth voltage (VN) outputted from the differential amplifier described above can be arbitrarily adjusted by controlling a gain of the variable gain amplifier.

The temperature compensation circuit of the aspect further includes a voltage adder that adds the fifth voltage, outputted from the variable gain amplifier, and the fourth voltage so as to output a sixth voltage.

In the aspect, the temperature compensation circuit is further provided with the voltage adder. The voltage adder adds, for example, the fourth voltage (the voltage VN: a voltage having a negative temperature characteristic) outputted from the differential amplifier to the fifth voltage (e.g., the voltage VY: a voltage having a positive temperature characteristic) outputted from the variable gain amplifier. As a result, a compensated analog reference voltage Vtemp (=an actual analog reference voltage AGND+the temperature compensation voltage VTS) is generated. Both of the fifth voltage (VY) and the fourth voltage (VN) are generated with respect to the reference voltage AGND, and voltage values thereof become AGND(25° C.) at normal temperature (25 degrees centigrade), for example. When the ambient temperature is other than room temperature (25 degrees centigrade), the voltage level of the temperature-compensated reference voltage Vtemp is determined by VY−VN. If a slope of a characteristic line expressing the temperature characteristic of the fourth voltage (VN) and that of the fifth voltage (VY) are set to be same, the voltage VY and the voltage VN are canceled out each other. Consequently, the voltage level of the voltage Vtemp is maintained at AGND(25° C.) in a wide temperature range.

Further, as described above, in compensation of a temperature characteristic of a circuit, the temperature-compensated voltage (Vtemp) may be required to have a desired temperature coefficient with respect to the temperature (to be sensitive with respect to the temperature) for some reason. In this case, a gain of the variable gain amplifier is controlled, whereby the temperature characteristic (that is, the slope of the characteristic line) of the fifth voltage (VY) can be arbitrarily changed.

Accordingly, the temperature compensation circuit of the aspect can flexibly respond to various demands of various circuits. That is, according to the aspect, temperature compensation with high accuracy is realized and further, a temperature compensation circuit having high flexibility is realized.

Further, the voltage adder adds the fourth voltage VN and the fifth voltage VY (a voltage obtained by inverting the voltage level of the fourth voltage VN), so that a noise (especially, a white noise) superimposed on the fourth voltage VN can be canceled out. Therefore, only a smaller noise is superimposed on the temperature-compensated voltage (Vtemp).

In the temperature compensation circuit of the aspect, the voltage adder may include a first voltage adding resistor and a second voltage adding resistor, the first voltage adding resistor may be coupled between the eleventh node, to which the fifth voltage is applied, and a twelfth node, and the second voltage adding resistor may be coupled between the seventh node and the twelfth node.

According to the aspect, a configuration of the voltage adder can be simplified. Therefore, a high integrated IC is advantageously realized.

According to the aspect of the invention, the following advantageous effects can be obtained, for example. A highly-accurate temperature compensation voltage can be efficiently generated. Also, a noise superimposed along a signal path can be reduced. Further, the temperature compensation voltage that is generated can be automatically added to an analog reference voltage. Thus, a temperature-compensated voltage can be generated with high accuracy in an efficient manner. Furthermore, a temperature compensation circuit that can compensate various temperature characteristics of a circuit and has high adaptability can be realized.

BRIEF DESCRIPTION OF THE DRAWINGS

The invention will be described with reference to the accompanying drawings, wherein like numbers reference like elements.

DETAILED DESCRIPTION OF EMBODIMENTS

Figure 7:
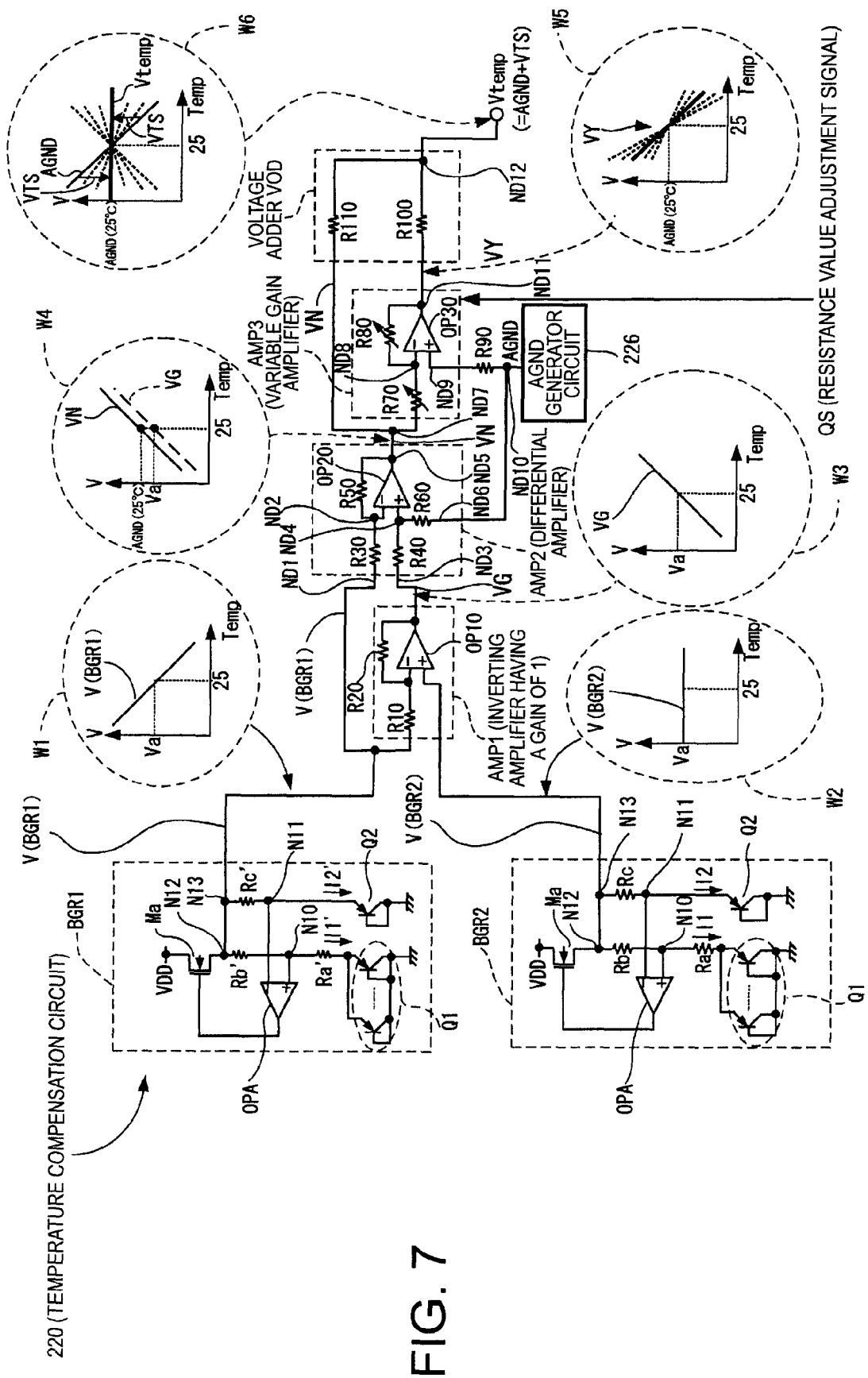
FIG. 7 is a diagram for explaining a configuration and an operation of the temperature compensation circuit.

A specific configuration of a temperature compensation circuit of the invention is illustrated in FIG. 7. That is, FIG. 7 shows a first embodiment of the invention. Here, the temperature compensation circuit shown in FIG. 7 can be used together with an offset compensation circuit 210 that compensates direct-current offset in a synchronous detection circuit 600, for example, as shown in FIG. 1.

Therefore, before a circuit configuration and an operation of the temperature compensation circuit shown in FIG. 7 is described, a sensing circuit 900 including the synchronous detection circuit 600, the offset compensation circuit 210, and a temperature compensation circuit 220 will be described with reference to FIGS. 1 to 6. Understanding on the sensing circuit 900 of FIG. 1 facilitates understanding on a specific circuit configuration, an operation, and features of the temperature compensation circuit 220 shown in FIG. 7.

Schematic Configuration and Operation of Sensing Circuit

Figure 1:
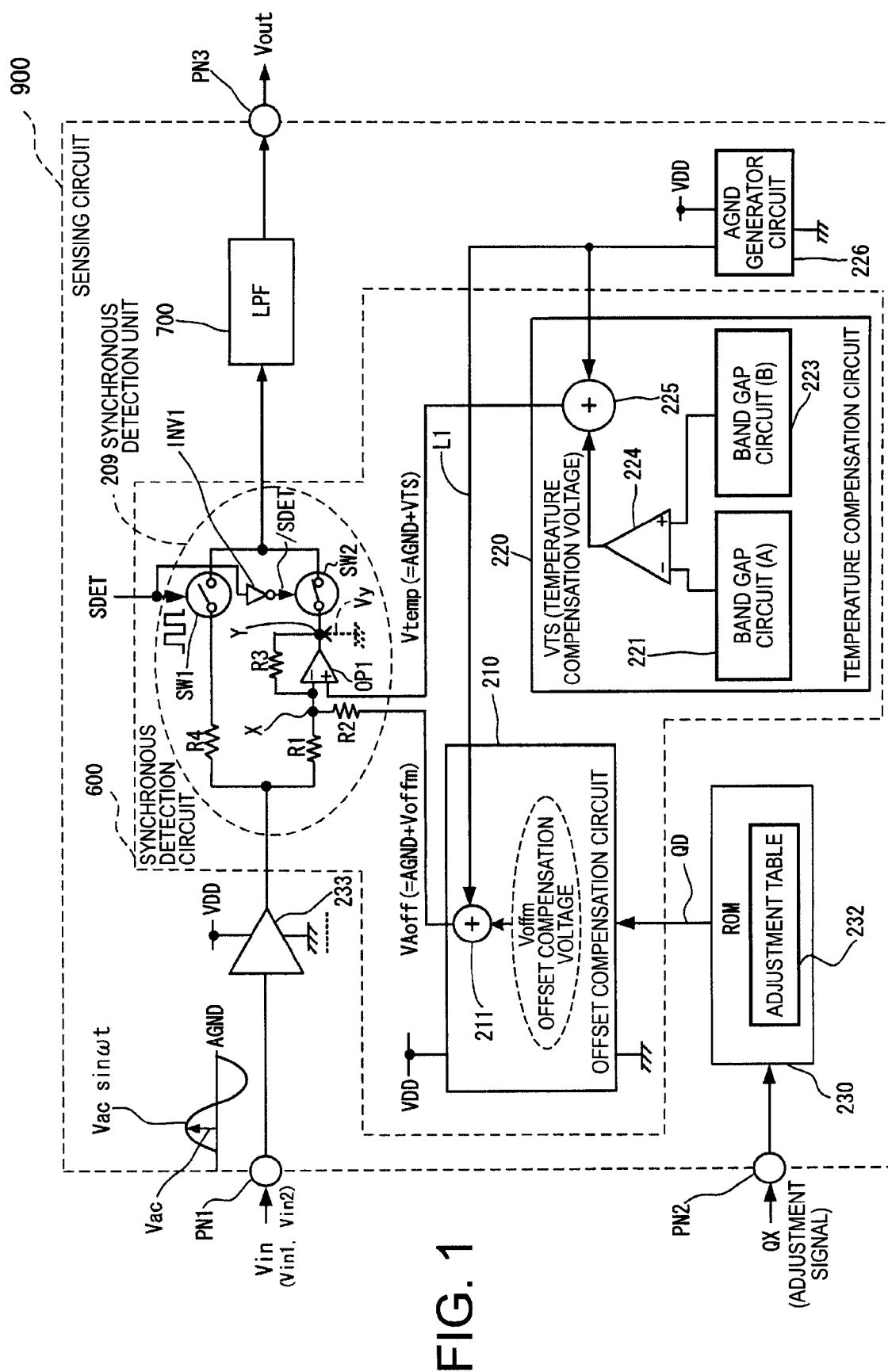
FIG. 1 is a circuit diagram showing a configuration of a sensing circuit including a temperature compensation circuit.

FIG. 1 is a circuit diagram illustrating a configuration of a sensing circuit including a synchronous detection circuit. This sensing circuit 900 includes: the synchronous detection circuit 600; a first stage amplifier 233; a low pass filter (LPF) 700; a ROM 230 including an adjustment table 232; an AGND generator circuit (an AGND source) 226 generating an analog reference voltage (a direct current bias voltage) AGND; a first terminal PN1 to which an input signal Vin is inputted; a second terminal PN2 to which an adjustment signal QX is inputted; and a third terminal PN3 from which a sensed output Vout is outputted.

The synchronous detection circuit 600 includes a synchronous detection unit 209, the offset compensation circuit 210, and the temperature compensation circuit 220.

The first stage amplifier 233 is a Q/V converter circuit that converts a charge (Q) of the input signal Vin from a vibrator (not shown in FIG. 1) into a voltage (V), for example. The sensing circuit 900 operates between a high level power supply voltage VDD and a low level power supply voltage GND (ground potential), for example. The input signal Vin is a sine wave (or a cosine wave) that oscillates with respect to the analog reference voltage (the direct current bias voltage) AGND, and is synchronized with a reference signal SDET.

The input signal Vin includes an input signal Vin 1 and an input signal Vin 2. The input signal Vin 1 is in-phase with the reference signal SDET. The input signal Vin 2 has a component whose phase is shifted 90 degrees with respect to the reference signal SDET (a quadrature component). The input signals Vin 1 and Vin 2 are synchronously-detected by the synchronous detection circuit 600. The synchronous detection circuit 600 synchronously-detects the input signals Vin 1 and Vin 2 by using the reference signal SDET. The synchronously-detected signal is converted into a direct current with the low pass filter (LPF) 700 that serves as a smoothing circuit. As a result, a detection output Vout is obtained.

The synchronous detection unit 209 of the synchronous detection circuit 600 includes a first signal path (hereafter, referred to as a non-inverting path) and a second signal path (hereafter, referred to as an inverting path). The first signal path transmits an input signal without inverting a level of the input signal. The second signal path transmits an input signal of which a level is inverted with an inverting amplifier. On the non-inverting path, a resistor R4 and a first switch SW1 are provided. On the inverting path, the inverting amplifier and a second switch SW2 are provided. The inverting amplifier includes an input resistor R1, an operational amplifier OP1, and a feedback resistor R3.

The first switch SW1 and the second switch SW2 are composed of an NMOS transistor, for example. The first switch SW1 is turned on/off by the reference signal SDET. The second switch SW2 is turned on/off by a signal/SDET obtained by inverting the level of the reference signal SDET with an inverter INV1.

The offset compensation circuit 210 generates an offset compensation voltage Voffm for canceling an offset voltage Voff that is superposed on the sensed output Vout. The offset compensation voltage Voffm is added to the analog reference voltage AGND, which is generated by the AGND generator circuit 226, by an adding circuit 211. The AGND generator circuit 226 has a circuit configuration in which a high level power supply voltage VDD is divided by two voltage dividing resistors, which have the same resistance value, so as to generate VDD/2, for example. Thus, VAoff (=Voffm+AGND) is generated. VAoff is applied to a node X in the synchronous detection circuit 600 through a resistor R2. That is, VAoff is applied to an inverting input terminal (a first input node) of the inverting amplifier, namely, the operational amplifier OP1 that is provided on the inverting path of the synchronous detection circuit 600. A specific structural example of the offset compensation circuit 210 will be described later with reference to FIGS. 4 to 6.

Here, Voffm=−Voff is satisfied. That is, a potential difference between an offset compensation voltage Voffm and the analog reference voltage AGND is same as that between the offset voltage Voff and the analog reference voltage AGND. Further, a polarity, with respect to the analog reference voltage AGND, of the offset compensation voltage Voffm is opposite from a polarity, with respect to the analog reference voltage AGND, of the offset voltage Voff. In the following description, when the "polarity" is referred, a reference voltage is the voltage AGND. In a case shown in FIG. 1, the voltage Voffm that is outputted from the offset compensation circuit 210 is applied to the inverting input terminal of the operational amplifier OP1. For example, when the offset voltage Voff has positive polarity (Voff>0), the offset compensation voltage Voffm outputted from the offset compensation circuit 210 also has positive polarity (Voffm>0). However, since Voffm is applied to the inverting input terminal of the operational amplifier OP1, −Voffm having opposite polarity from the offset voltage (+Voff) is applied to the signal transmission path as a result.

That is, the application of VAoff (=Voffm+AGND) lowers (or raises) a level of the signal (direct current) after the synchronous detection. When a voltage value according to this variation is matched with the voltage value of the offset voltage Voff that is superposed on the detection output, the offset voltage Voff that is superposed on the detection output Vout can be removed.

The voltage value of the offset compensation voltage Voffm can be adjusted by the adjustment signal QX inputted from the second terminal PN2. That is, when the adjustment signal QX is inputted from the second terminal PN2, an adjustment table 232 included in the ROM (for example, an EEPROM) 230 is accessed by the adjustment signal QX. As a result, a correction data QD is outputted from the adjustment table 232. The voltage value of the offset compensation voltage Voffm is adjusted by the correction data QD. With a look-up table method, the correction data QD can be generated efficiently and automatically.

The temperature compensation circuit 220 includes, for example, a band gap circuit (A) 221, a band gap circuit (B) 223, a differential amplifier 224, and the AGND generator circuit 226. From the differential amplifier 224, a temperature compensation voltage VTS is generated. The temperature compensation voltage VTS is added to the voltage AGND, which is generated by the AGND generator circuit 226, by the adding circuit 225. Accordingly, a temperature-compensated analog reference voltage Vtemp (=VTS+AGND) is generated. In the following description, Vtemp may be referred to as a temperature-compensated voltage and also be simply described as Vtemp. The voltage Vtemp is applied to a non-inverting input terminal (a second input node) of the operational amplifier OP1 that is provided on the inverting path of the synchronous detection circuit 600.

The synchronous detection circuit 600 is provided with no high-gain amplifier. Accordingly, when an alternating current signal is converted into a direct current signal (i.e., in the synchronous detection), the offset compensation voltage Voffm and the temperature compensation voltage VTS are added to the same place so as to minimize the influence of a 1/f noise of the circuit. Therefore, an S/N ratio of the sensing circuit can be improved.

Operation of Synchronous Detection Circuit

Figure 2:
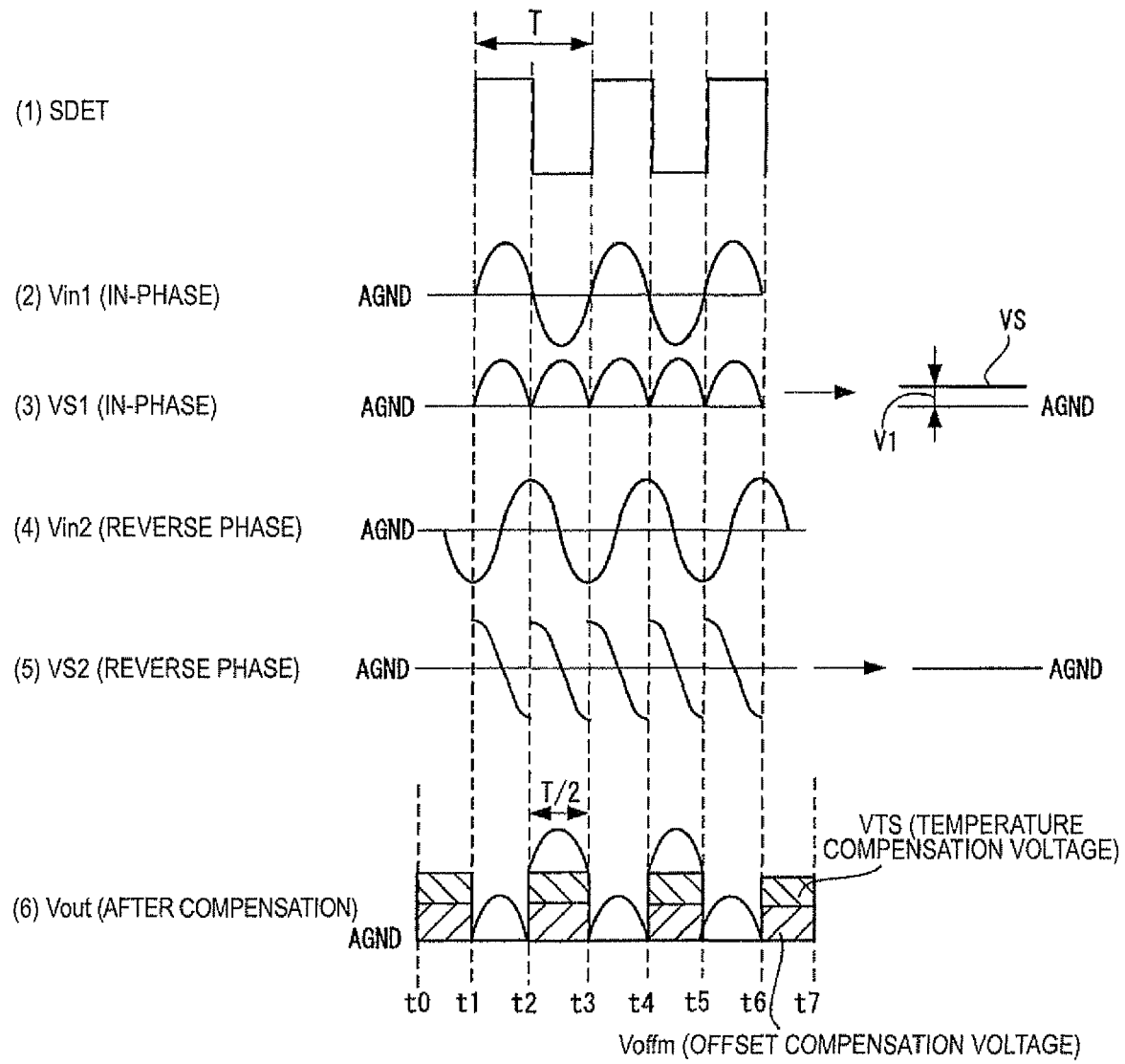
FIG. 2 is a diagram for explaining an operation of a synchronous detection circuit.

FIG. 2 is a diagram for explaining an operation of a synchronous detection circuit. A common operation of the synchronous detection unit 209 in the synchronous detection circuit 600 will now be described.

As described above, the input signal Vin includes the signal Vin 1 and the signal Vin 2. The signal Vin 1 is a component in-phase with the reference signal SDET. The signal Vin 2 is a component whose phase is shifted 90 degrees with respect to the reference signal SDET (the quadrature component). The synchronous detection circuit 600 includes the synchronous detection unit 209. The synchronous detection unit 209 synchronously-detects the signal Vin 1 and the signal Vin 2 by using the reference signal SDET. As a result, detection signals VS1 and VS2 are obtained. The detection signals VS1 and VS2 are converted into direct current with the low pass filter (LPF) 700 that serves as the smoothing circuit.

As shown in (1) of FIG. 2, the reference signal SDET is a square wave with a period T. As shown in (2) of FIG. 2, the signal Vin1 that is an in-phase component is a sine wave (or a cosine wave) that oscillates with respect to the analog reference voltage AGND (the direct current bias voltage), and is synchronized with the reference signal SDET.

If the signal Vin1, that is, the in-phase component is synchronously-detected, a signal with a wave shape formed by fully rectifying the signal Vin1 is obtained, as shown in (3) of FIG. 2. When this signal is smoothed by the low pass filter (LPF) 700, a detection output VS is obtained, for example, as shown in the right side of (3) of the FIG. 2. The detection output VS is a direct current signal having a potential difference of +V1 with respect to the voltage AGND, for example.

On the other hand, the detection signal VS2 obtained by synchronously-detecting the signal Vin2 that is the quadrature component has the wave shape as shown in (5) of FIG. 2. In the wave shape, an area of the positive polarity is same as that of the negative polarity with respect to AGND as the reference. When the detection signal VS2 is smoothed by the low pass filter (LPF) 700, the area of the positive polarity and the area of the negative polarity are cancelled out each other. Therefore, the level of the detection output becomes AGND as shown in the right side of (5) of FIG. 2 (i.e., no signal). As a result, the signal Vin1 that is the in-phase component and is synchronized with the reference signal SDET can be selectively detected.

In the above description, the offset compensation voltage Voffm and the temperature compensation voltage VTS are not considered.

As described above, in the synchronous detection unit 209 of the synchronous detection circuit 600 of FIG. 1, the temperature compensation as well as the offset compensation are performed. A synchronous-detection output Vout (after the compensation) after the offset compensation and the temperature compensation is shown in (6) of FIG. 2. As shown in the figure, each of the offset compensation voltage Voffm and the temperature compensation voltage VTS is independently added to the signal Vin without influencing each other. The offset compensation voltage Voffm and the temperature compensation voltage VTS are added to the signal Vin at a half period (T/2), that is, periods from time t0 to time t1, time t2 to time t3, time t4 to time t5, and time t6 to time t7. Accordingly, highly-accurate offset compensation and highly-accurate temperature compensation can be both realized.

Figure 3:
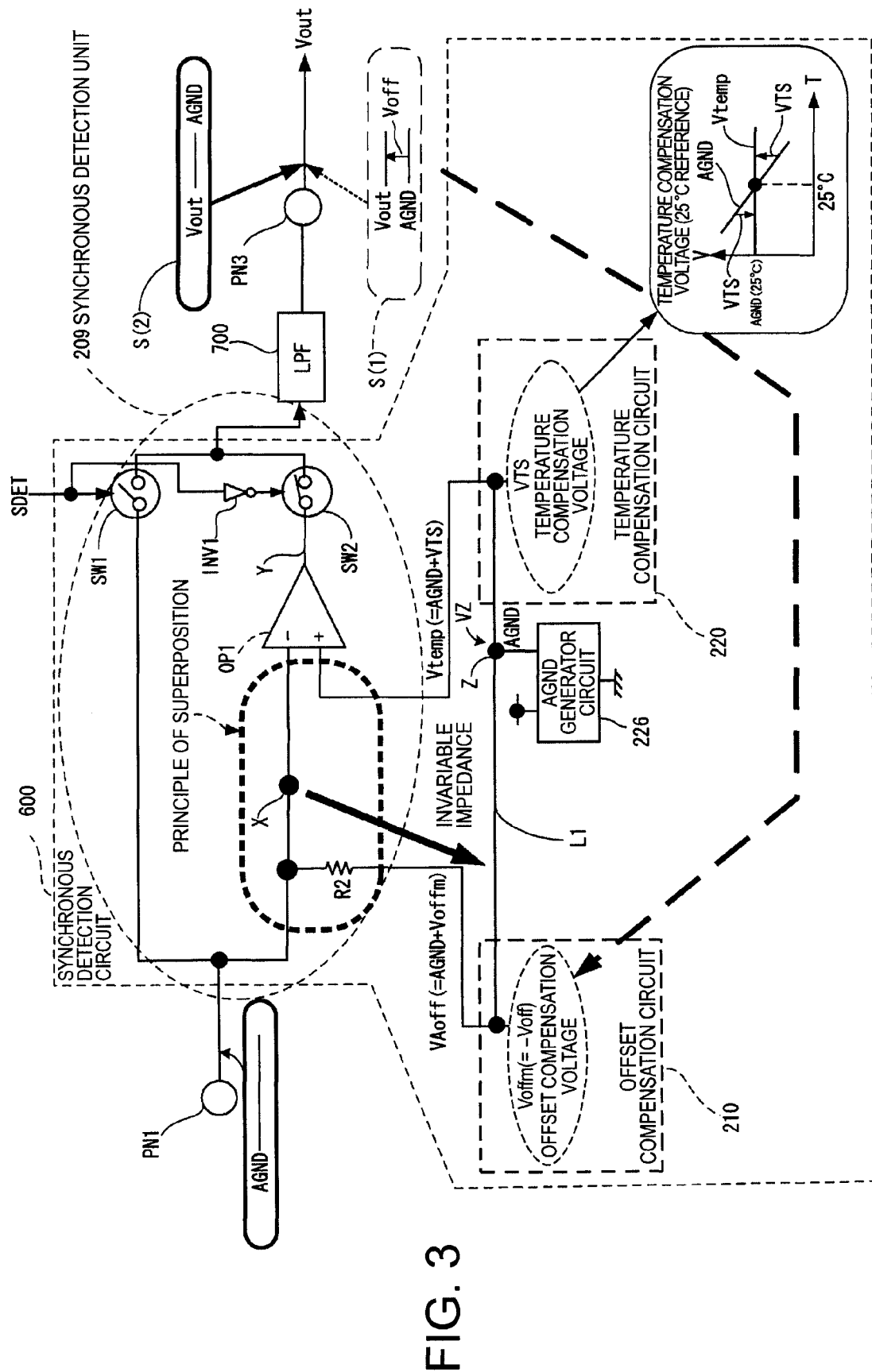
FIG. 3 is a diagram for explaining a relationship between an offset compensation voltage and a temperature compensation voltage, and an addition method of these voltages.

Relationship between Offset Compensation Voltage Voffm and Temperature Compensation Voltage VTS, and Addition Method of these Voltages FIG. 3 is a diagram for explaining a relationship between the offset compensation voltage Voffm and the temperature compensation voltage VTS, and the addition method of these voltages. A state that the input signal Vin is not applied to the first terminal PN1 is assumed in FIG. 3. In this case, a voltage level of the detection output Vout that is outputted from the third terminal PN3 ideally matches that of the analog reference voltage AGND in the absence of the offset voltage Voff (refer to a state S(2) shown in the right side of FIG. 3). However, the offset voltage Voff is actually superposed on the detection output Vout (refer to a state S(1) shown in the right side of FIG. 3). In order to remove the offset voltage Voff, the offset compensation voltage Voffm is applied to the inverting input terminal (the first input node) of the operational amplifier OP1. Thus, the offset voltage Voff is removed.

In addition, the voltage level of the analog reference voltage AGND varies according to the environmental temperature, for example, as shown in the lower right of FIG. 3 (for example, as the temperature rises, the voltage level of the voltage AGND is decreased). To the inverting input terminal of the operational amplifier OP1, VAoff (=AGND+Voffm) is applied. Voffm=−Voff is satisfied.

As described above, the voltage level of the offset compensation voltage Voffm does not depend on the temperature. Therefore, when the voltage level of the voltage AGND varies according to the ambient temperature, the voltage level of VAoff varies, lowering the accuracy of the offset compensation.

The voltage level of the voltage AGND at room temperature (here, 25 degrees centigrade) is referred to as AGND(25° C.). The offset compensation voltage Voffm is used for removing the offset voltage Voff at room temperature (25 degrees centigrade). Accordingly, it is preferable that the offset compensation voltage Voffm is always added to AGND (25° C.). In this structure, as shown in the lower right of FIG. 3, the voltage level of the voltage AGND is always maintained at AGND(25° C.) by adding the temperature compensation voltage VTS. Therefore, the highly-accurate offset compensation can be always performed regardless of the ambient temperature.

Layout Structure for Preventing Mutual Interference Between Offset Compensation Voltage Voffm and Temperature Compensation Voltage VTS As described above, the offset voltage Voff is expressed in the potential difference (a voltage difference) with respect to the voltage AGND. When the voltage level of the offset voltage Voff that is generated by a source of the offset voltage varies according to the ambient temperature, the analog reference voltage AGND also varies in the same manner. Therefore, the potential difference between these voltages can be regarded as unchanged. That is, the offset voltage Voff is a specific voltage for each sensing circuit (IC) 900 and does not depend on the temperature. Therefore, the offset compensation voltage Voffm does not depend on the temperature so as to be constant.

On the other hand, the temperature compensation voltage VTS is used for compensating variation, caused by the temperature, of the analog reference voltage AGND itself, and the voltage value thereof varies according to the ambient temperature. Therefore, in the circuit of FIG. 1, the voltage Voffm that is a direct current voltage and does not depend on the temperature, and the voltage VTS that depends on the temperature need to be independently added at the same place (the input terminal of the synchronous detection circuit).

Therefore, "Voffm" and "VTS" are applied to the input terminals of the operational amplifier (e.g., the differential amplifier) OP1 in parallel, as shown in FIG. 3. In this case, an output voltage of the inverting amplifier reflects each of "Voffm" and "VTS." That is, the level of the output voltage of the operational amplifier OP1 varies depending on each of "Voffm" and "VTS."

The offset compensation voltage Voffm is inputted into the inverting input terminal (the first input node) of the operational amplifier (the differential amplifier) OP1, and the temperature compensation voltage VTS is inputted into the non-inverting input terminal (the second input node) of the operational amplifier (the differential amplifier) OP1, for example.

At this time, such layout structure that can prevent mutual interference between the offset compensation voltage Voffm and the temperature compensation voltage VTS is preferably employed. That is, a voltage VAoff of the inverting input terminal is expressed as VAoff=AGND+Voffm, and a voltage Vtemp of the non-inverting input terminal is expressed as Vtemp=AGND+VTS. The voltages VAoff and Vtemp of respective terminals must be electrically independent.

In such layout structure that cannot ensure electrical independence of the offset compensation voltage Voffm and the temperature compensation voltage VTS, the temperature compensation voltage VTS may leak in the offset compensation circuit 210 through an AGND wiring, for example. In this case, the voltage level of the offset compensation voltage Voffm (which should not depend on the temperature, originally) varies depending on the temperature. Thus, the independence of the temperature compensation voltage VTS and the offset compensation voltage Voffm is not guaranteed. That is, the voltage level of the voltage Voffm (which does not have temperature dependence, originally) depends on the ambient temperature and varies due to an influence of the voltage VTS. In this case, two compensation voltages that are electrically independent from each other are not generated.

In a case of FIG. 3, the analog reference voltage AGND is supplied to each of the offset compensation circuit 210 and the temperature compensation circuit 220 through a common AGND wiring L1. The AGND generator circuit 226 is provided between the offset compensation circuit 210 and the temperature compensation circuit 220. Here, a common connection point of the AGND wiring L1 and the AGND generator circuit 226 is referred to as a Z point, and the voltage applied to the Z point is referred to as VZ. An output impedance of the AGND generator circuit 226 is substantially small, so that a potential at the Z point is always maintained at the analog reference voltage AGND. Therefore, the electrical independence between the offset compensation voltage Voffm and the temperature compensation voltage VTS is maintained. That is, even if the potential of the AGND wiring L1 slightly varies due to the temperature compensation voltage VTS, the potential variation is all absorbed at the Z point. Accordingly, the temperature compensation voltage VTS does not leak in the offset compensation circuit 210.

In the case of FIG. 3, the common AGND wiring L1 is used as an AGND wiring of the offset compensation circuit 210 and that of the temperature compensation circuit 220, so that the layout structure can be simplified. In addition, the following layout structure can be employed. That is, such a structure can be employed that a first AGND generating circuit for the offset compensation circuit 210 is provided, a second AGND generating circuit for the temperature compensation circuit 220 is provided, the offset compensation circuit 210 and the first AGND generating circuit is coupled by a first AGND wiring, and the temperature compensation circuit 220 and the second AGND generating circuit is coupled by a second AGND wiring (i.e., the layout structure in which the voltage Voff and the voltage VTS are electrically isolated, and further physically isolated).

As described, in FIG. 3, the analog reference voltages AGND for two input terminals (the first and the second input nodes) of the operational amplifier OP1 are electrically isolated from each other. Accordingly, the temperature compensation voltage VTS and the offset compensation voltage Voffm can be independently applied to the two input terminals (the first and the second input nodes) of the inverting amplifier to be added independently.

Proof with Equations

Hereinafter, the description in which the voltage Voffm and the voltage VTS can be independently added will be proved with equations. In the following description, Vin=AGND+Vac·sin ω t is satisfied. Voffm denotes the offset compensation voltage and VTS denotes the temperature compensation voltage. Further, Vy denotes the voltage of an output terminal of the operational amplifier OP1, and SDET denotes a reference signal of the synchronous detection.

A node of the inverting input terminal of the operational amplifier OP1 in the synchronous detection unit 209 of the synchronous detection circuit 600 is referred to as a node X. The inverting input terminal and the non-inverting input terminal have the same potential in accordance with a virtual short.

A current equation at the node X can be expressed as Equation (1) by Kirchhoff's current equation.

$$\frac{Vin - (AGND + VTS)}{R1} + \frac{(AGND + Voffm) - (AGND + VTS)}{R2} + \frac{Vy - (AGND + VTS)}{R3} = 0 \quad (1)$$

When Equation (1) is solved for Vy, Equations (2) and (3) are obtained.

$$Vy = -\frac{R3}{R1}(Vin - AGND - VTS) - \\ \frac{R3}{R2}(AGND + Voffm - AGND - VTS) + AGND + VTS \quad (2)$$

$$Vy = -\frac{R3}{R1}(Vin - AGND - VTS) - \frac{R3}{R2}(Voffm - VTS) + AGND + VTS \quad (3)$$

Here, Vin is substituted for the input signal and the equation is rearranged for Vy, providing Equations (4) to (6).

$$Vy = -\frac{R3}{R1}(AGND + V_{AC}\sin\omega t - AGND - VTS) - \\ \frac{R3}{R2}(Voffm - VTS) + AGND + VTS \quad (4)$$

$$Vy = -\frac{R3}{R1}(V_{AC}\sin\omega t - VTS) - \frac{R3}{R2}(Voffm - VTS) + AGND + VTS \quad (5)$$

$$Vy = -\frac{R3}{R1}V_{AC}\sin\omega t + AGND - \frac{R3}{R2}Voffm - VTS\left(1 + \frac{R3}{R1} + \frac{R3}{R2}\right) \quad (6)$$

A gain of a common inverting amplifier for synchronous detection is −1, so that R1=R3 is satisfied. Therefore, Equation (7) is obtained.

$$Vy = -V_{AC}\sin\omega t + AGND - \frac{R3}{R2}Voffm + \left(2 + \frac{R3}{R2}\right)VTS \quad (7)$$

Here, if the sine wave that is inputted is in-phase with the reference signal SDET and a duty ratio of the signal SDET is 50%, the output voltage of the synchronous-detection output Vout is expressed as Equation (8).

$$Vout = \frac{1}{2}\left\{\frac{2}{\pi}V_{AC} + AGND - \frac{R3}{R2}Voffm + \left(2 + \frac{R3}{R2}\right)VTS\right\} + \\ \frac{1}{2}\left(\frac{2}{\pi}V_{AC}\sin\omega t + AGND\right) \quad (8)$$

In Equation (8), the first term indicates an output of the inverting amplifier, and the second term indicates an output in a case where Vin is outputted as it is. Therefore, Equation (9) is derived, and Equation (10) is obtained by rearranging Equation (9).

$$Vout = \frac{2}{\pi}V_{AC} + AGND + \frac{1}{2}\left\{-\frac{R3}{R2}Voffm + \left(2 + \frac{R3}{R2}\right)VTS\right\} \quad (9)$$

$$Vout = \frac{2}{\pi}V_{AC} + AGND - \frac{1}{2}\frac{R3}{R2}Voffm - \frac{1}{2}\left(2 + \frac{R3}{R2}\right)VTS \quad (10)$$

Thus, synchronous detection is normally performed, and the reference voltage AGND is as it is. Further, the offset compensation voltage Voffm and the temperature compensation voltage VTS are added independently.

Addition Depending on Principle of Superposition

Next, addition by using the principle of superposition will be described. The offset compensation voltage Voffm and the temperature compensation voltage VTS need to be added independently of each other. Therefore, each of two compensation voltages needs to be superposed along the signal path by using the principle of superposition. The principle of superposition is such that, in a linear electric circuit having a plurality of voltage sources, a voltage at any point equals to a sum of voltages of the plurality of voltage sources of a case where they exist singly. In order to apply the principle of superposition, a linearity of the signal path needs to be ensured.

For example, when the temperature compensation voltage VTS is applied to the non-inverting input terminal (the second input node) of the inverting amplifier, it must be ensured that the level of an output signal of the inverting amplifier varies linearly by only depending on the temperature compensation voltage VTS (otherwise, a voltage component that is superposed on the voltage AGND and varies according to the temperature can not be canceled). Therefore, the impedance of the offset compensation circuit when viewed from a common connection node (referred to as the node X) of the inverting input terminal (the first input node) of the inverting amplifier and the offset compensation circuit needs to be always constant. That is, the impedance of the offset compensation circuit with respect to the inverting input terminal (the first input node) of the inverting amplifier is preferably constant regardless of an operating state of the offset compensation circuit.

If the impedance of the offset compensation circuit varies according to the state of the offset compensation circuit, an amount of the current flowing between the node X and the offset compensation circuit varies according to the state of the offset compensation circuit. Accordingly, the voltage of the node X varies, and correspondingly, the output of the inverting amplifier also varies. In this case, the output of the inverting amplifier does not follow "varying linearly only depending on the voltage level of the temperature compensation voltage VTS applied to the non-inverting input terminal of the inverting amplifier", so that the linearity of the signal path does not ensured.

Therefore, the offset compensation circuit 210 is designed so that the impedance of the offset compensation circuit 210 when viewed from the first input node (the node X in FIG. 3) of the inverting amplifier can be constant regardless of the operating state of the offset compensation circuit 210. Accordingly, the offset compensation voltage Voffm and the temperature compensation voltage VTS can be added independently of each other by the principle of superposition.

Configuration of Offset Compensation Circuit

Figure 4:
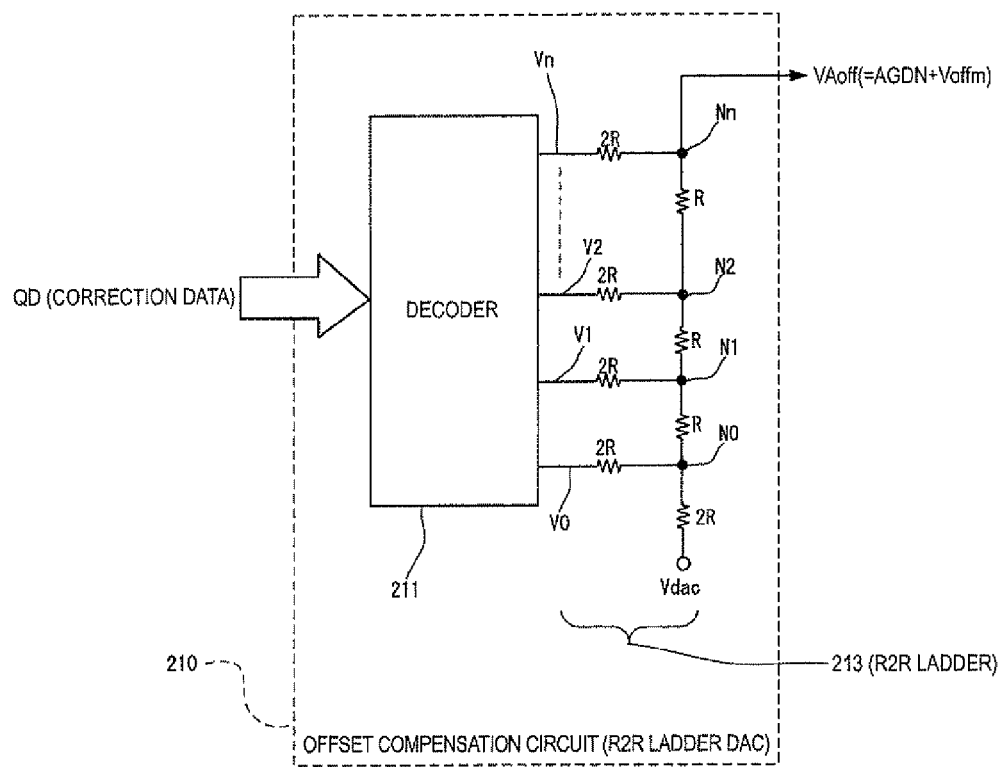
FIG. 4 is a circuit diagram showing a configuration of an offset compensation circuit that is an R2R ladder type D/A converter circuit.

Here, an example of a circuit configuration of the offset compensation circuit 210 (an example using an R2R ladder type D/A converter) will be described. FIG. 4 is a circuit diagram showing a configuration of an offset compensation circuit. An R2R ladder type D/A converter circuit is used as the offset compensation circuit.

An R2R ladder 213 includes two kinds of unit resistors (resistors R and 2R) that are coupled in a ladder shape. A decoder 211 decodes inputted correction data QD so as to output digital data of (n+1) bit (i.e., voltage V0 to Vn).

Figure 5A:
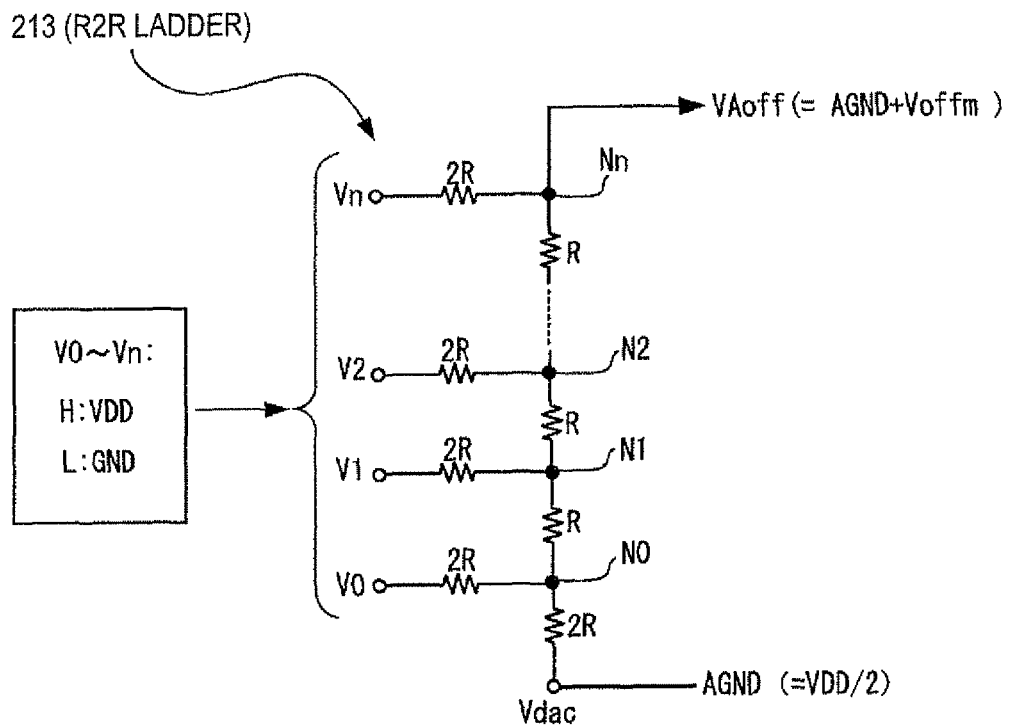
FIGS. 5A and 5B are diagrams for explaining an operation of the R2R ladder type circuit.
Figure 5B:
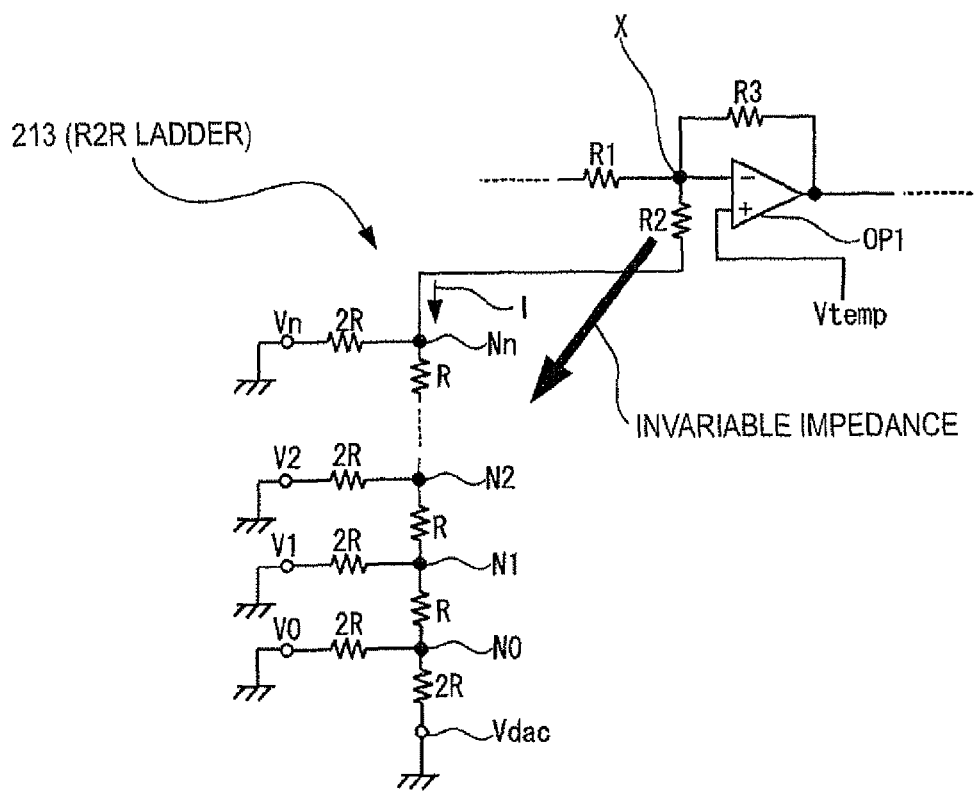

FIGS. 5A and 5B are diagrams for explaining an operation of the R2R ladder type circuit shown in FIG. 4. In FIG. 5A, an "H" level of each of the voltages V0 to Vn is VDD and an "L" level is GND, for example. In addition, a reference voltage Vdac of the D/A converter circuit is the voltage AGND, for example. Turning each of the voltages V0 to Vn to the "H" level or the "L" level can vary a voltage level of a voltage VAoff (=AGND+Voffm) outputted from the R2R ladder type circuit.

Here, this is described with equations. Referring to FIG. 5A, when a current equation at a node N0 is solved, Equations (11) to (13) are derived.

$$\frac{N_0 - V_{doc}}{2R} + \frac{N_0 - V_0}{2R} + \frac{N_0 - N_1}{R} = 0 \qquad (11)$$

$$N_0 - V_{doc} + N_0 - V_0 + 2N_0 - 2N_1 = 0 \qquad (12)$$

$$4N_0 - V_{doc} + V_0 + 2N_1 \qquad (13)$$

In addition, when a current equation at a node N1 is solved, Equations (14) and (17) are derived.

$$\frac{N_1 - N_0}{R} + \frac{N_1 - V_1}{2R} + \frac{N_1 - N_1}{R} = 0 \qquad (14)$$

$$2N_1 - 2N_0 + N_1 - V_1 + 2N_1 - 2N_2 = 0 \qquad (15)$$

$$5N_1 = 2N_0 + V_1 + 2N_2 \qquad (16)$$

$$10N_1 = 4N_0 + 2V_1 + 4N_2 \qquad (17)$$

Here, from Equation (13) above, Equations (18) and (19) are derived.

$$10N_1 = V_{doc} + V_0 + 2N_1 + 2V_1 + 4N_2 \qquad (18)$$

$$8N_2 = V_{doc} + V_0 + 2V_1 + 4N_2 \qquad (19)$$

In addition, when a current equation at a node N2 is solved, Equations (20) to (23) are derived.

$$\frac{N_2 - N_1}{R} + \frac{N_2 - V_2}{2R} = 0 \qquad (20)$$

$$2N_2 - 2N_1 + N_2 - V_2 = 0 \qquad (21)$$

$$3N_2 = 2N_1 + V_2 \qquad (22)$$

$$12N_2 = 8N_1 + 4V_2 \qquad (23)$$

Here, from Equation (19) above, Equations (24) to (26) are derived $$12N_2 = V_{doc} + V_0 + 2V_1 + 4N_2 + 4V_2 \qquad (24)$$

$$8N_2 = V_{doc} + V_0 + 2V_1 + 4V_2 \qquad (25)$$

$$N2 = \frac{V_{doc} + 2^0 x V_0 + 2' x V_3 + 2^2 x V_2}{2^3} \qquad (26)$$

That is, when a current equation at a node Nn is solved, Equation (27) is derived.

$$N_n = \frac{V_{doc} + 2^0 x V_0 + 2' x V_1 + \ldots + 2'' x V_n}{2^{n+1}} \qquad (27)$$

A voltage at the node Nn varies according to voltage values of the voltages Vdac and V0 through Vn. If GND, VDD, AGND, or other reference voltage (VREF) is inputted as each of the voltage values of the voltages Vdac and V0 through Vn, the voltage of the node Nn varies. Thus, VAoff (=AGND+Voffm) can also be produced.

Next, with FIG. 5B, it will be described that the impedance, when viewed from the node X, at the R2R ladder type D/A converter circuit is constant.

For example, all of the voltages V0 to Vn are set to be GND. An equivalent circuit of the R2R ladder type circuit in this case is as shown FIG. 5B. The resistance of parts inputting the voltages V0 to Vn is extremely low, so that the resistance can be ignored. Accordingly, the impedance of the R2R ladder type circuit is unambiguously determined by the equivalent circuit of FIG. 5B. That is, the impedance of the R2R ladder type D/A converter circuit when viewed from the node X is always constant. Therefore, as described above, the principle of superposition can be applied.

Figure 6:
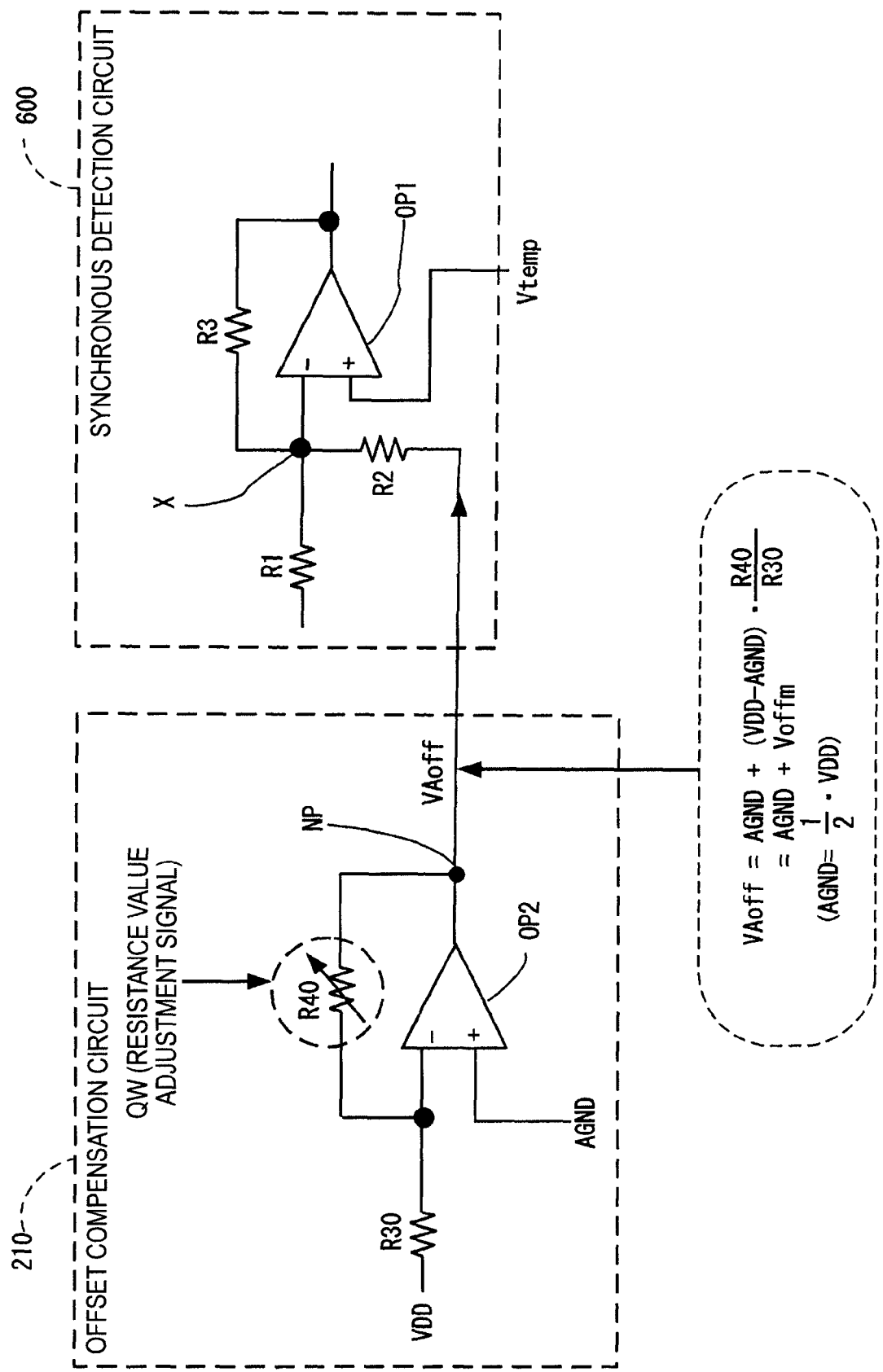
FIG. 6 is a circuit diagram showing another configuration of the offset compensation circuit.

FIG. 6 is a circuit diagram for explaining another circuit configuration of the offset compensation circuit.

Referring to FIG. 6, the offset compensation circuit 210 has an inversion amplifier including an input resistor R30, a feedback resistor R40, and an operational amplifier OP2. The feedback resistor R40 is a variable resistor. When a resistance value of the feedback resistor R40 is varied by a resistance value adjustment signal QW, the level of an output voltage of the inversion amplifier (i.e., the offset compensation voltage) can be arbitrarily varied.

In addition, since an output impedance of the operational amplifier OP2 is extremely low, the impedance viewed from the node X can be considered as always constant.

A high level power supply voltage VDD is inputted into an inverting input terminal of the operational amplifier OP2, and the analog reference voltage AGND is inputted into a non-inverting input terminal of the same. The inversion amplifier amplifies a voltage difference between the voltage VDD and the voltage AGND. AGND is VDD/2, for example. The voltage VDD and the voltage AGND similarly vary with respect to the temperature. Accordingly, the voltage difference (=VDD−AGND) of these voltages does not vary in accordance with the temperature. Therefore, if a gain of the operational amplifier is appropriately adjusted, a voltage in which the analog reference voltage AGND is superposed on the offset compensation voltage Voff (a voltage of which a voltage value does not vary in accordance with the temperature) can be produced.

The output voltage VAoff of the inversion amplifier shown in FIG. 6 is expressed as the following equation.

$$VAoff = AGND + (VDD - AGND) \cdot R40/R30$$

In the equation above, Voffm is substituted for (VDD−AGND)·R40/R30 so as to derive VAoff=AGND+Voffm. Therefore, an offset compensation voltage can be generated with respect to the voltage AGND as a reference. The offset compensation circuit shown in FIG. 6 has a simple circuit configuration. Therefore, an occupation area and cost can be reduced.

The configuration and the operation of the sensing circuit 900 shown in FIG. 1 have been described. Hereinafter, a circuit configuration and an operation of the temperature compensation circuit according to embodiments of the invention (a temperature compensation voltage generating circuit) will be described. Note that embodiments described below do not unduly limit the scope of the present invention described in the claims and all of the elements described in the embodiments are not indispensable to the means to solve the problem of the invention.

First Embodiment

In a first embodiment, an example of a specific configuration of the temperature compensation circuit 220 shown in FIG. 1 and its operation will be described.

Specific Configuration Example and Operation of Temperature Compensation Circuit In the first embodiment, a configuration example of an offset compensation circuit will be described. FIG. 7 is a diagram for explaining an example of a configuration and an operation of a temperature compensation circuit.

Referring to FIG. 7, this temperature compensation circuit 220 includes; first and second band gap circuits (reference voltage generating circuits) BGR1 and BGR2 having the same circuit configuration as each other; an inverting amplifier AMP1 having a gain of 1; a differential amplifier AMP2; a variable gain amplifier AMP3; a voltage adder VOD; and an AGND generator circuit 226. FIG. 7 shows voltage characteristics of main voltages in the temperature compensation circuit 220 with respect to the temperature. The characteristics are shown in a circled manner by dashed lines (refer to characteristic charts W1 to W6 of the FIG. 7).

In FIG. 7, for convenience of the description, V(BGR1) denotes a first voltage, V(BGR2) denotes a second voltage, VG denotes a third voltage, VN denotes a fourth voltage, VY denotes a fifth voltage, and the temperature-compensated voltage Vtemp is called a sixth voltage.

Configuration and Operation of Band Gap Circuits BGR1 and BGR2

The first band gap circuit BGR1 (hereafter, referred to as BGR1) and the second band gap circuit BGR2 (hereafter, referred to as BGR2) have the same circuit configuration as each other. However, BGR1 includes Ra' used as a first resistor, Rb' used as a second resistor, and Rc' used as a third resistor. While, BGR2 includes Ra used as a first resistor, Rb used as a second resistor, and Rc used as a third resistor. BGR1 and BGR2 have the same circuit configuration, so that BGR1 and BGR2 obtain the same characteristics as each other.

It is preferable that BGR1 and BGR2 be manufactured by the same semiconductor process technique and be disposed close to each other. Accordingly, variation of elements constituting the circuit BGR1 and that of elements constituting the circuit BGR2 become same as each other, so that ratio accuracy between the resistors can be improved. That is, ratio accuracy between the resistance values of the first resistors Ra and Ra' is high. The ratio accuracy between the second resistors Rb and Rb', and that between the third resistors Rc and Rc' are also high as is the case with the first resistors Ra and Ra'. Providing the same circuit configuration to BGR1 and BGR2 and improving the ratio accuracy between the resistors as above permit levels of output voltages of BGR1 and BGR2 to be the same voltage value Va at room temperature (25 degrees centigrade, for example).

From BGR1, a signal increasing in proportion to the temperature, namely the first voltage V(BGR1) is obtained. On the other hand, from BGR2, a constant voltage that does not depend on the temperature, namely, the second voltage V(BGR2) is obtained.

The operation of BGR1 and BGR2 will be described below. Since the basic configuration and operation of BGR1 and BGR2 are same, the operation of BGR2 will be described below.

Referring to FIG. 7, OPA denotes an operational amplifier, Ra, Rb, and Rc respectively denote the first, second, and third resistors. In addition, Q1 and Q2 denote PN junction diodes (diode-connected PNP transistors). The PN junction diode Q1 includes n number of transistors that have the same size as the diode Q2 and are coupled in parallel. A junction area of the PN junction diode Q1 is n times (n is an integer of 2 or more) as large as the PN junction diode Q2. If I1=I2 is satisfied, for example, when I1 denotes current that flows in the PN junction diode Q1 and I2 denotes current that flows in the PN junction diode Q2, a current density ratio between the PN junction diodes Q1 and Q2 is 1:n.

In addition, an input terminal of the operational amplifier OPA is imaginary-shorted, so that potentials at nodes N10 and N11 are equivalent to each other.

Therefore, Equation (28) below is derived.

$$Vbe(Q2)=Vbe(Q1)+V(Ra) \qquad (28)$$

Here, Vbe(Q2) denotes a forward voltage of the PN junction diode Q2. Vbe(Q1) denotes a forward voltage of the PN junction diode Q1. V(Ra) denotes a voltage across the first resistor Ra.

From Equation (28), Equation (29) is derived.

$$V(Ra)=Vbe(Q2)-Vbe(Q1) \qquad (29)$$

Here, a temperature coefficient of the voltage V(Ra) (i.e., a coefficient obtained by partially differentiating the voltage V(Ra) with the temperature) is denoted as K1. Similarly, a negative temperature coefficient of the voltage Vbe(Q2) (a coefficient obtained by partially differentiating the voltage Vbe(Q2) with the temperature) is denoted as K2, and a negative temperature coefficient of the voltage Vbe(Q1) (a coefficient obtained by partially differentiating the voltage Vbe(Q1) with the temperature) is denoted as K3. Since the PN junction diodes Q1 and Q2 are biased with different current densities, an absolute value of the negative temperature coefficient K3 of the voltage Vbe(Q1) is larger than an absolute value of the negative temperature coefficient K2 of the voltage Vbe(Q2). Therefore, the temperature coefficient of the voltage V(Ra) is positive. That is, the negative temperature coefficient K3 having a larger absolute value than K2 is subtracted from the negative temperature coefficient K2, resulting in the positive temperature coefficient K3.

In other words, the voltage across the first resistor Ra has a positive temperature coefficient (i.e., a tendency to increase as the temperature increases). This means that the current I1 that flows through the first resistor Ra has the positive temperature coefficient (a tendency to increase as the temperature increases). The current I1 having the positive temperature coefficient flows to the second resistor Rb, resulting in generation of a voltage V(Rb) having a positive temperature coefficient at the second resistor Rb. V(BGR2) that is an output voltage of BGR2 is expressed as V(BGR2)=Vbe(Q2)+V(Rb). Then, if each of the resistance values of the first, second, and third resistors Ra, Rb, and Rc and the junction area of the PN junction diode Q1 (i.e., the value of n described above) are appropriately set, the negative temperature coefficient of the voltage Vbe(Q2) is almost completely canceled out by the positive temperature coefficient of the voltage V(Rb). Therefore, the output voltage V(BGR2) of BGR2 does not depend on the temperature (a constant voltage Va) (refer to the characteristic chart W2, surrounded by the dashed line in FIG. 7, of the voltage V(BGR2)).

Hereinafter, the details will be described. As described above, the current that flows through the third resistor Rc and the PN junction diode Q2 is denoted as I2, and the current that flows through the second resistor Rb and the PN junction diode Q1 is denoted as I1. The forward voltages of the PN junction diodes Q1 and Q2 are respectively Vbe(Q1) and Vbe(Q2). From the rectification equation of diode, Vbe(Q1) and Vbe(Q2) can be respectively expressed as Equations (30) and (31).

$$Vbe(Q1)=(kT/q)In(I1/Is(Q1)) \qquad (30)$$

$$Vbe(Q2)=(kT/q)In(I2/Is(Q2)) \qquad (31)$$

In the equations above, k denotes Boltzmann constant, T denotes an absolute temperature, q denotes an elementary charge, and Is(Q1) and Is(Q2) respectively denote saturated currents of the PN junction diodes Q1 and Q2.

In addition, in regard to the second and third resistors Rb and Rc, Equation (32) is satisfied.

$$I2:I1=Rb:Rc \qquad (32)$$

Accordingly, Equation (33) is derived.

$$I1=I2 \cdot Rc/Rb \qquad (33)$$

When Equations (30) and (31) are substituted into Equation (29), the voltage V(Ra) across the first resistor Ra is expressed as Equation (34) below.

$$V(Ra)=(kT/q)In(I2I9 \cdot Is(Q1)/I1 \cdot Is(Q2)) \qquad (34)$$

Further, Equation (33) is substituted into Equation (34), deriving Equation (35).

$$V(Ra)=(kT/q)In(Rb \cdot Is(Q1)/Rc \cdot Is(Q2)) \qquad (35)$$

Here, the output voltage V(BGR2) of the band gap circuit BGR2 is expressed by Equation (36).

$$V(BGR2)=V(Ra) \cdot Rb/Ra+Vbe(Q2) \qquad (36)$$

Further, Equation (35) is substituted into Equation (36), deriving Equation (37).

$$V(BGR2)=(Rb/Ra)(kT/q)In(Rb \cdot Is(Q1)/Rc \cdot Is(Q2))+Vbe(Q2) \qquad (37)$$

Here, for example, the PN junction diode Q1 has such a structure that n number of bipolar transistors (n is an integer of 2 or more) having the exactly same layout pattern as the PN junction diode Q2 are connected in parallel in an array. In this case, the saturated current Is(Q1) of the PN junction diode Q1 is n times as large as the saturated current Is(Q2) of the PN junction diode Q2. Accordingly, Equation (38) below is derived.

$$Is(Q1)=n \cdot Is(Q2) \qquad (38)$$

Here, Equation (38) is substituted into Equation (36), deriving Equation (39).

$$V(BGR2)=(Rb/Ra)(kT/q)In(n \cdot Rb/Rc)+Vbe(Q2) \qquad (39)$$

The resistance values of the resistors Ra, Rb, and Rc and the n number of bipolar transistors coupled in parallel in the PN junction diode Q1 are constants all determined by designing. A constant G is defined as Equation (40) below.

$$G=(Rb/Ra)In(n \cdot Rb/Rc) \qquad (40)$$

When V(BGR2) is expressed by using the constant G, Equation (41) is obtained.

$$V(BGR2)=G \cdot (kT/q)+Vbe(Q2) \qquad (41)$$

Here, a thermal voltage (kT/q) is a linear function having a positive slope k/q (e.g., 0.085 mV/° C.) with respect to the temperature T. In addition, Vbe(Q2) is determined depending on the thermal voltage (kT/q) and temperature dependency (a temperature characteristic) of the saturated current Is (Q2) of the PN junction diode Q2. The saturated current Is(Q2) of the PN junction diode Q2 has the temperature dependency that has an approximate line shape of about −2 mV/° C., for example. Therefore, in the above example, setting the constant G to have a value of about "23" (nearly equals to −Is/(kT/q)) makes the output voltage V(BGR2) of the band gap circuit BGR2 be a constant voltage having no temperature dependency.

The operation of the band gap circuit BGR2 is specifically described above. Similarly, in the band gap circuit BGR1, if each resistance value of the first, second, and third resistors Ra', Rb40 and Rc' is appropriately set, the negative temperature coefficient of the voltage Vbe(Q2) is not completely canceled out by the positive temperature coefficient of the voltage V(Rb). Therefore, the output voltage V(BGR1) of the circuit BGR1 has such a characteristic that the voltage level decreases as the temperature increases (i.e., a negative temperature coefficient) (refer to the characteristic chart W1, surrounded by the dashed line in FIG. 7, of the voltage V(BGR1)).

That is, in the example above, if the constant G is set to be less than "23", for example, the negative temperature coefficient of the voltage Vbe(Q2) can not be completely canceled out. Accordingly, the output voltage V(BGR1) of the band gap circuit BGR1 is permitted to have a characteristic monotonically decreasing depending on the temperature.

The band gap circuits BGR1 and BGR2 have the same circuit configuration as each other, and are preferably manufactured by the same semiconductor process so as to be provided adjacent to each other. Accordingly, the transistors and the resistors thereof have high ratio accuracy. The two band gap circuits BGR1 and BGR2 have the uniform characteristics, so as to output the same voltage (e.g., the voltage Va) at room temperature (e.g., 25 degrees centigrade). An error between output voltage levels of the bang gap circuits BGR1 and BGR2 at room temperature causes an error when these voltages are added by the differential amplifier AMP2. Therefore, the band gap circuits BGR1 and BGR2 preferably have the same circuit configuration as each other. More preferably, the circuits BGR1 and BGR2 are manufactured by the same semiconductor process so as to be provided adjacent to each other. Accordingly, the two band gap circuits BGR1 and BGR2 are permitted to have the uniform characteristics with high accuracy.

Note that the circuit configuration of the band gap circuits BGR1 and BGR2 is not limited to the one shown in FIG. 7, but various configurations may be employed. For example, a current mirror circuit may be used instead of the operational amplifier OPA. Further, a band gap circuit using a subthreshold voltage of a MOS transistor may be used, for example.

Configuration and Operation of Inverting Amplifier (Specifically, Inverting Amplifier Having Gain of 1) AMP1

In FIG. 7, the output voltage V(BGR2) of the band gap circuit BGR2 is inputted into a non-inverting input terminal of the inverting amplifier AMP1 having a gain of 1. The inverting amplifier AMP1 includes an operation amplifier OP10, a resistor R10, and a resistor R20. In the inverting amplifier AMP1, the resistor 10 and the resistor 20 have the same resistance values as each other. That is, R10=R20 is satisfied. In the equation, R10 denotes the resistance value of the resistor R10 and R20 denotes the resistance value of the resistor R20 (similar in the following description). However, the resistors R10 and R20 may have different resistance values from each other, depending on the circuit configuration.

The output voltage V(BGR1) of the band gap circuit BGR1 is inputted into an inverting input terminal of the operational amplifier OP10 via the resistor R10. The output voltage V(BGR2) of the band gap circuit BGR2 is directly inputted into a non-inverting input terminal of the operational amplifier OP10. Accordingly, the inverting amplifier AMP 1 inverts and amplifies a difference between the voltage V(BGR2), which does not depend on the temperature, and the voltage V(BGR1), which has the characteristic monotonically decreasing with respect to the temperature, by a gain of 1. From the inverting amplifier AMP1, a voltage VG (a third voltage) is obtained. The voltage VG depends on the temperature and its voltage value increases as the temperature increases (refer to the characteristic chart W3, surrounded by the dashed line in FIG. 7, of the voltage VG). The two band gap circuits BGR1 and BGR2 have uniform characteristics, so that a temperature characteristic of the voltage VG is determined with high accuracy. In addition, since the inverting amplifier AMP 1 is a differential amplifier, noise superimposed on the two inputs (the voltage V(BGR1) and the voltage V(BGR2)) and having the same polarity is canceled out, whereby noise reduction is realized.

Configuration and Operation of Differential Amplifier AMP2

In FIG. 7, a first node ND1 to a twelfth node ND12 are respectively set for describing a configuration and an operation of the differential amplifier AMP2. These nodes are mainly used for specifying precise positions of resistors and potentials at main points.

The output voltage V(BGR1) of the band gap circuit BGR1 and the output voltage VG of the inverting amplifier AMP1 are respectively inputted into an inverting input terminal and a non-inverting input terminal of the differential amplifier AMP2.

The differential amplifier AMP2 includes: an operational amplifier OP20, a first resistor R30, a second resistor R40, a third resistor R50, and a fourth resistor R60. The first resistor R30 is coupled between the first node ND1 and the second node (an inverting input terminal of the operational amplifier OP20) ND2. The second resistor R40 is coupled between the third node ND3 and the fourth node (a non-inverting input terminal of the operational amplifier OP20) ND4. The third resistor R50 is coupled between the fifth node (an output node of the operational amplifier OP20) ND5 and the second node ND2. The fourth resistor R60 is coupled between the fourth node ND4 and the sixth node (an AGND node) ND6.

To the sixth node ND6, an analog reference voltage (a direct current bias voltage) AGND generated by the AGND generator circuit 226 is applied. It is because a reference voltage for generating a temperature-compensated reference voltage Vtemp is the voltage AGND.

As described with reference to FIG. 1, a role of the temperature compensation circuit 220 is to maintain the voltage level of the analog reference voltage (the direct current bias voltage) AGND on the signal transmission path at the voltage level of room temperature (25 degrees centigrade) (that is, at AGND(25° C.)) regardless of a change of the ambient temperature, for example. As shown in FIG. 1, the temperature compensation voltage VTS for canceling a temperature offset is superposed on the reference voltage AGND. When a voltage obtained by superposing the temperature compensation voltage VTS on an actual analog reference voltage AGND is referred to as a temperature-compensated voltage Vtemp, for example, the following equation is satisfied in a wide range of the temperature. The equation is as follows: Vtemp=AGND+ VTS=AGND(25° C.). AGND(25° C.) denotes a voltage level of the reference voltage AGND at room temperature. In order to generate the temperature-compensated reference voltage Vtemp, a circuit operation with the voltage AGND as a reference level is required. Therefore, the voltage AGND is applied to the non-inverting input terminal (the fourth node ND4) of the operational amplifier OP20.

Adjusting resistance values of the first resistor R30 to the fourth resistor R60 enables adjusting of the gain of the differential amplifier AMP2. Here, it is preferable to set the resistance values of the resistors R30 and R40 to be equal. In addition, it is preferable to set the resistance values of the resistors R50 and R60 to be equal. That is, in the differential amplifier AMP2, it is preferable that R30=R40 and R50=R60 be satisfied.

Figure 11:
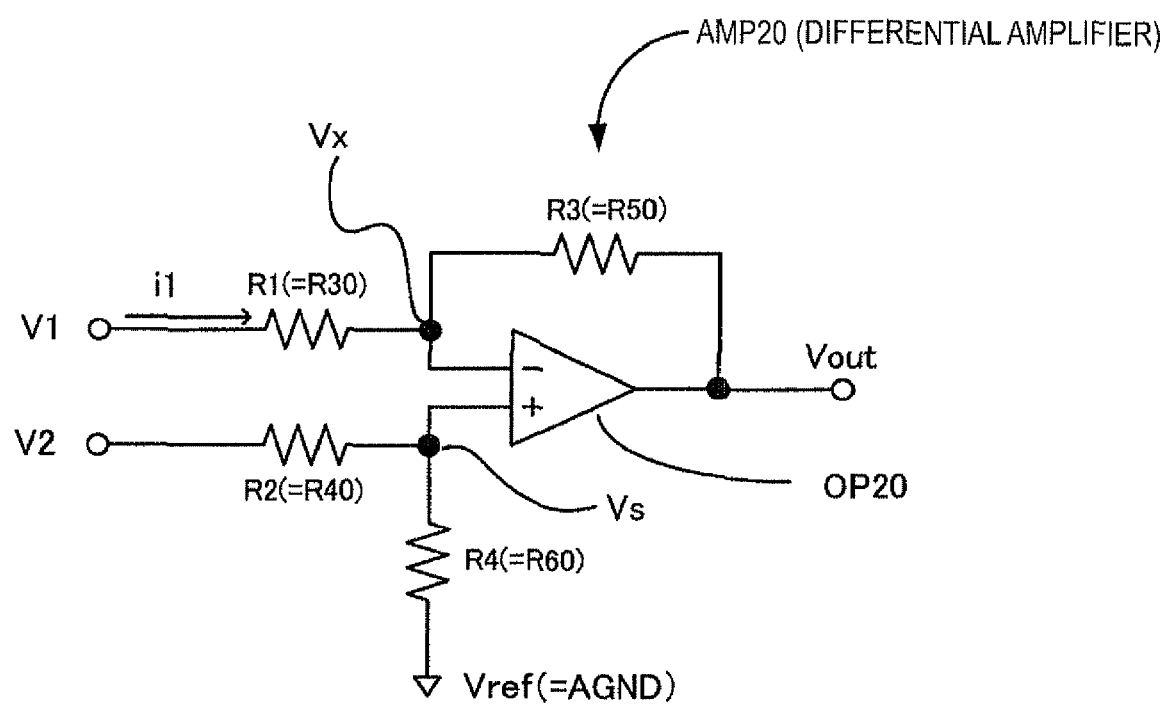
FIG. 11 is a diagram for explaining a transfer function of a differential amplifier shown in FIG. 7.

The differential amplifier AMP2 basically multiplies a voltage difference between the voltage V(BGR1) and the voltage VG by −(R50/R30) (the specific operation will be described with reference to FIG. 11).

As a result, a voltage VN is obtained from the output node ND5 of the differential amplifier AMP2. The voltage VN has a characteristic of increasing as the temperature increases (i.e., a positive temperature coefficient) (refer to the characteristic chart W4, surrounded by the dashed line in FIG. 7, of the voltage VN). As shown in the characteristic chart W4 of the voltage VN, a voltage value of the voltage VN becomes AGND(25° C.) at room temperature (25 degrees centigrade). The voltage VG has a voltage value of Va at room temperature (25 degrees centigrade). Both of the voltages VG and VN have such characteristic that their voltage levels are proportional to the temperature, and characteristic lines expressing the characteristics of the voltages VG and VN have the same slope, for example. That is, the characteristic line of the voltage VN is considered to be obtained by shifting the characteristic line of the voltage VG upward by the voltage difference between the analog reference voltage AGND(25° C.) at room temperature and the voltage Va so that the voltage level with respect to room temperature (25 degrees centigrade) becomes AGND (25° C.), for example (AGND(25° C.)≧Va).

In the differential amplifier AMP2, a voltage level of the non-inverting input terminal (the fourth node ND4) of the operational amplifier OP20 is expressed as AGND+VG. A voltage level of the inverting input terminal (the second node ND2) of the operational amplifier OP20 is V(BGR1). The voltage difference between these voltage levels is multiplied (inverted and amplified) by R50/R30. Thus, the characteristic line of the voltage VN as shown in the characteristic chart W4 is obtained. That is, the voltage VN (the fourth voltage) having such characteristics is obtained that the voltage becomes AGND(25° C.) at room temperature (25 degrees centigrade) and the voltage level increases as the temperature increases (i.e., the positive temperature coefficient).

Hereinafter, the operation of the differential amplifier AMP2 will be more specifically described with the reference to FIG. 11. FIG. 11 is a diagram for explaining a transfer function of the differential amplifier shown in FIG. 7. FIG. 11 shows four resistors R1 to R4 for convenience of description. The resistor R1 corresponds to the first resistor R30 in FIG. 7. The resistor R2 corresponds to the second resistor R40 in FIG. 7. The resistor R3 corresponds to the third resistor R50 in FIG. 7. The resistor R4 corresponds to the fourth resistor R60 in FIG. 7. An input voltage V1 is applied to the inverting input terminal of the operational amplifier OP20, and an input voltage V2 is applied to the non-inverting input terminal of the same. An output of the operational amplifier OP20 is denoted as Vout. A potential of a common connection point of the resistors R1 and R3 is denoted as Vx, and that of the resistors R3 and R4 is denoted as Vs. A reference voltage is denoted as Vref. The reference voltage Vref is the reference voltage AGND, for example. Further, current flowing into the common connection point of the resistors R1 and R3 is denoted as i1. In FIG. 11, Equations (42) and (43) below are satisfied.

$$\frac{(V1-Vx)}{R1} + \frac{(Vout-Vx)}{R3} = 0 \tag{42}$$

$$\frac{(V2-Vs)}{R2} + \frac{(Vref-Vs)}{R4} = 0 \tag{43}$$

Vx=Vs is satisfied due to a virtual short. Accordingly, Equation (43) can be expressed as Equation (44) below. In addition, when Equation (42) above is rearranged for Vx, Equation (45) below is derived. Similarly, when Equation (44) is rearranged for Vx, Equation (46) below is derived.

$$\frac{(V2-Vx)}{R2} + \frac{(Vref-Vx)}{R4} = 0 \tag{44}$$

$$\frac{V1}{R1} + \frac{Vout}{R3} - \left(\frac{1}{R1} + \frac{1}{R3}\right)Vx = 0 \tag{45}$$

$$\frac{V2}{R2} + \frac{Vref}{R4} - \left(\frac{1}{R2} + \frac{1}{R4}\right)Vx = 0 \tag{46}$$

By solving Equation (46) for Vx, Equation (47) is obtained. Next, by substituting Equation (47) into Equation (45), Equation (48) is obtained. By rearranging Equation (48), Equation (49) is obtained.

$$Vx = \frac{R2R4}{R2+R4}\left(\frac{V2}{R2} + \frac{Vref}{R4}\right) \tag{47}$$

$$\frac{V1}{R1} + \frac{Vout}{R3} - \left(\frac{1}{R1} + \frac{1}{R3}\right)\frac{R2R4}{R2+R4}\left(\frac{V2}{R2} + \frac{Vref}{R4}\right) = 0 \tag{48}$$

$$\frac{V1}{R1} + \frac{Vout}{R3} - \frac{R1+R3}{R1R3}\frac{R2R4}{R2+R4}\left(\frac{V2}{R2} + \frac{Vref}{R4}\right) = 0 \tag{49}$$

A parameter x is defined as Equation (50). When Equation (49) above is rearranged by using the parameter x, Equation (51) below is obtained. Equation (51) is solved for Vout, deriving Equation (52). Then, Vout is expressed as Equation (53) when R1=R2 and R3=R4 are satisfied.

$$\frac{R1+R3}{R1R3}\frac{R2R4}{R2+R4} = x \tag{50}$$

$$\frac{V1}{R1} - x\frac{V2}{R2} + \frac{Vout}{R3} - x\frac{Vref}{R4} = 0 \tag{51}$$

$$Vout = -\frac{R3}{R1}V1 + x\frac{R3}{R2}V2 + x\frac{R3}{R4}Vref \tag{52}$$

$$Vout = -\frac{R3}{R1}(V1-V2) + Vref \tag{53}$$

As is apparent from Equation (53) above, when R1=R2 and R3=R4 are satisfied, Vref (i.e., the voltage AGND (the analog reference voltage) that is an arbitrary voltage) is expressed as an independent term in the equation of Vout (Equation (52)). That is, when R1=R2 and R3=R4 are satisfied, the operational amplifier OP20 shown in FIG. 11 multiplies a voltage difference between the input voltages V1 and V2 by ·(R3/R1), and adds the voltage Vref (=AGND) singly to the resulting voltage obtained by multiplying by ·(R3/R1). As a result, the output voltage Vout is obtained. That is, when R1=R2 and R3=R4 are satisfied, as is apparent from Equation (53), the voltage difference between the two input voltages V1 and V2 of the operational amplifier OP20 is inverted and amplified. The gain of the amplification is determined by a ratio between a resistance value of the first resistor R1, of which one end is coupled to the inverting input terminal of the operational amplifier OP20, and a resistance value of the resistor R3 that is a feedback resistor. An output voltage of the operational amplifier 20 varies to have a positive polarity or a negative polarity with respect to an arbitrary reference voltage Vref (=AGND) by the voltage that is inverted and amplified. The differential amplifier AMP 20 shown in FIG. 11 is an inverting amplifier circuit that operates with the reference voltage Vref (=AGND) as a reference level, and multiplies a difference between two input voltages (the voltages V1 and V2) by (R3/R1).

As is apparent from the above description, in a case of the differential amplifier AMP2 of FIG. 7, when R30=R40 and R50=R60 are satisfied, a voltage difference between the output voltage V(BGR1) of the first band gap circuit BGR1 and the output voltage VG of the inverting amplifier AMP1 is multiplied by −(R50/R30). Then, the voltage AGND is singly added to the resulting voltage obtained by multiplying by −(R50/R30). As a result, the voltage VN is obtained. The differential amplifier AMP2 of FIG. 7 is the inverting amplifier circuit that operates with the reference voltage Vref (=AGND) as a reference level, and multiplies the difference between two input voltages (the voltages V1 and V2) by (R50/R30).

The output voltage VN of the differential amplifier AMP2 can be expressed in a form that the temperature compensation voltage VTS is added to the analog reference voltage AGND. The temperature compensation voltage VTS is obtained by inverting a potential polarity of a voltage difference between "a voltage that depends on the temperature" and "a voltage that does not depend on the temperature" and amplifying the resulting voltage difference by a predetermined gain. That is, the output voltage VN is expressed as VN=AGND+VTS. The voltage VN can be considered as the temperature-compensated analog reference voltage Vtemp. Accordingly, when the non-inverting input terminal of the operational amplifier OP1 in the synchronous detection circuit 600 of FIG. 1 is biased by the voltage VN, the synchronous detection circuit 600 is temperature-compensated. That is, the fourth voltage VN having a positive temperature coefficient can be basically used as the temperature-compensated analog reference voltage (Vtemp).

Configuration and Operation of Variable Gain Amplifier AMP3.

Referring back to FIG. 7, a further description will be made. The fourth voltage VN, described above, having a positive temperature coefficient can be basically used as the temperature-compensated analog reference voltage (Vtemp). However, the temperature-compensated voltage Vtemp may be required to have a desired temperature coefficient (to be sensitive with respect to the temperature) in the circuit design for some reason. If the temperature compensation circuit 220 shown in FIG. 7 can meet such requirement, the circuit 220 can respond flexibly to various demands of various circuits.

Therefore, the temperature compensation circuit 220 shown in FIG. 7 is provided with a variable gain amplifier AMP3 and a voltage adder VOD so as to arbitrarily adjust a slope of the characteristic line of the voltage VN. Consequently, the voltage Vtemp (=AGND+VTS) having variable temperature characteristic can be arbitrarily generated.

The variable gain amplifier AMPS includes an operational amplifier OP30, a variable resistor (a fifth resistor) R70, a resistor (a sixth resistor) R90, and a variable resistor (a feedback resistor having a variable resistance value: a seventh resistor) R80. The variable resistor R70 is coupled between the seventh node ND7 and the eighth node ND8 (an inverting input terminal of the operational amplifier OP30). The resistor R90 is coupled between the ninth node (a non-inverting input terminal of the operational amplifier OP3) ND9 and the tenth node (an AGND node) ND10. The variable resistor R80 is coupled between the node ND11 that is an output node of the operational amplifier OP30 and the eighth node ND8.

A gain of the variable gain amplifier AMP3 can be arbitrarily adjusted by changing resistance values of the variable resistors R70 and R80. The resistance values of the variable resistors R70 and R80 can be adjusted by a resistance value adjusting signal. Further, the variable gain amplifier AMP3 is an inverting amplifier. Furthermore, to the non-inverting input terminal of the operational amplifier OP30 included to the variable gain amplifier AMP3, the voltage AGND from the AGND generator circuit 226 is applied. Therefore, the variable gain amplifier AMP3 serves as an inverting amplifier circuit that operates with the voltage AGND as a reference level, and the gain thereof is determined by R80/R70. An output voltage (the fifth voltage) VY of the variable gain amplifier AMP3 has a negative temperature coefficient. Specifically, a characteristic of the voltage level with respect to the temperature is expressed by a linear function with a negative slope (that is, having a characteristic of a negative primary proportion with respect to the temperature). The slope of the characteristic line expressing the temperature characteristic of the fifth voltage VY can be arbitrarily adjusted by changing the resistance values of the variable resistors R70 and R80 (refer to the characteristic chart W5, surrounded by the dashed line in FIG. 7, of the voltage VY). The fifth voltage VY can be used as the temperature-compensated voltage Vtemp.

Configuration and Operation of Voltage Adder VOD

The voltage adder VOD includes a first voltage adding resistor R100 and a second voltage adding resistor R110. The first voltage adding resistor R100 is coupled between the eleventh node ND11 and the twelfth node ND12. The second voltage adding resistor R110 is coupled between the seventh node ND7 and the twelfth node ND12. The twelfth node ND12 is a common connection node of the first voltage adding resistor R100 and the second voltage adding resistor R110.

Resistance values of two resistors (the first voltage adding resistor R100 and the second voltage adding resistor R110) included in the voltage adder VOD are set to be same, for example. The voltage adder VOD adds the voltage VN (a voltage having a negative temperature characteristic) to the voltage VY (a voltage having a positive temperature characteristic). As a result, the temperature-compensated voltage (the sixth voltage) Vtemp (=AGND+VTS) is generated.

Both of the fifth voltage VY and the fourth voltage VN are generated with respect to the voltage AGND as a reference level, and voltage values thereof become AGND(25° C.) at normal temperature (25 degrees centigrade). When the ambient temperature is not at normal temperature (25 degrees centigrade), the voltage level of the temperature-compensated reference voltage Vtemp is determined by VY−VN. If a slope of a segment of the characteristic line of the fourth voltage VN shown in the characteristic chart W4 and that of the fifth voltage VY shown in the characteristic chart W5 are same, the fifth voltage VY and the fourth voltage VN are cancelled out each other. Therefore, the voltage level of the voltage Vtemp is maintained at AGND(25° C.) in a wide temperature range. That is, if the resistor R70 and the resistor R80 are set to be equal to each other in the variable gain amplifier AMP3, the variable gain amplifier AMP3 merely functions as an inverting amplifier having a gain of 1. In this case, the voltage Vtemp is maintained at AGND(25° C.) in a wide temperature range. Consequently, the temperature compensation with respect to the voltage AGND can be realized (refer to the characteristic chart W6, surrounded by the dashed line in FIG. 7, of the voltage Vtemp).

As is apparent from the characteristic chart W6 of the voltage Vtemp, in a case where the voltage level of the temperature-compensated voltage Vtemp is maintained at AGND (25° C.) in the wide temperature range, a voltage difference between an actual AGND and AGND(25° C.) is the temperature compensation voltage VTS. That is, as shown in FIG. 1, the temperature-compensated voltage Vtemp is obtained by adding the temperature compensation voltage VTS to an actual analog reference voltage AGND (Vtemp=AGND+ VTS). If the actual voltage AGND has a negative polarity with respect to AGND(25° C.), the temperature compensation voltage VTS has a positive polarity with respect to the actual voltage AGND. If the actual voltage AGND has a positive polarity with respect to the AGND(25° C.), the temperature compensation voltage VTS has a negative polarity with respect to the actual voltage AGND.

That is, the actual voltage AGND has a negative temperature coefficient, but the negative temperature coefficient is cancelled out by the temperature compensation voltage VTS having a positive temperature coefficient. Accordingly, the voltage Vtemp that is the voltage AGND after temperature compensation does not depend on the temperature to be constant (=AGND(25° C.)) in the wide temperature range.

Further, the voltage adder VOD adds the voltage VN and the voltage VY (a voltage obtained by inversion-amplifying the voltage VN), being able to cancel a noise (especially, a white noise) superimposed on the voltage VN. Therefore, further noise reduction can be realized with respect to the temperature-compensated voltage (Vtemp).

Thus, the temperature compensation for the analog reference voltage AGND (analog ground) is realized.

Further, in a case where a temperature characteristic of a circuit is compensated, the temperature-compensated voltage Vtemp may be required to have a desired temperature coefficient (to be sensitive with respect to the temperature) for some reason. The temperature compensation circuit 220 shown in FIG. 7 can meet such requirement. That is, the voltage level of the temperature compensation voltage VTS is arbitrarily adjusted by controlling the temperature characteristic (namely, a slope of the characteristic line) of the output voltage VY of the variable gain amplifier AMP3.

That is, a plurality of characteristic lines drawn in dashed lines are shown in the characteristic chart W6 of the voltage Vtemp. Thus, the characteristic of the temperature-compensated voltage Vtemp with respect to the temperature can be arbitrarily adjusted by adjusting the gain of the variable gain amplifier AMPS. Therefore, the temperature compensation circuit of the embodiment can flexibly respond to various demands of various circuits. That is, according to the embodiment, temperature compensation with high accuracy is realized and further, a temperature compensation circuit having high flexibility is realized.

Second Embodiment

In a second embodiment, a gyro sensor including a physical quantity measuring device (IC) will be described. To the physical quantity measuring device (IC), a crystal resonator serving as a physical quantity transducer, for example, is coupled.

Gyro sensors include a rotary gyro sensor, a vibration gyro sensor, and the like. These kinds are distinguished by a way of detecting force that acts on a material. Among these gyro sensors, the vibration gyro sensor is suitable for miniaturization and cost reduction from viewpoints of components and the like. The vibration gyro sensor that detects an angular velocity acting on a material includes a piezoelectric vibration type gyro sensor that vibrates quartz crystal or a piezoelectric element and is advantageous to reliability or miniaturization. The piezoelectric vibration type gyro sensor uses Coriolis force which is generated, when an angular velocity is applied on a vibrating material, in an orthogonal direction to the vibration.

For example, in the vibration type gyro sensor that detects an angular velocity, a driving vibration in a certain direction is generated in the physical transducer (a vibrator). When an angular velocity is applied to the vibrator, Coriolis force is generated in an orthogonal direction to the driving vibration. Consequently, a sensing vibration is generated. The sensing vibration is generated in the orthogonal direction to the driving vibration, so that the sensing signal (a signal generated by the sensing vibration) has a phase shifted by 90 degrees with respect to a phase of the driving signal (a signal generated by the driving vibration). Accordingly, the sensing signal can be detected in distinction from the driving signal by the synchronous detection described above. By a use of a crystal resonator as the vibrator, the vibration type gyro sensor can be miniaturized and its reliability can be improved. The vibration type gyro sensor has various uses, and is used for detecting, for example, a shake of a video camera or a digital camera, a position of a global positioning system (GPS) of a car navigation system, and a posture of an air carrier or a robot.

Figure 8:
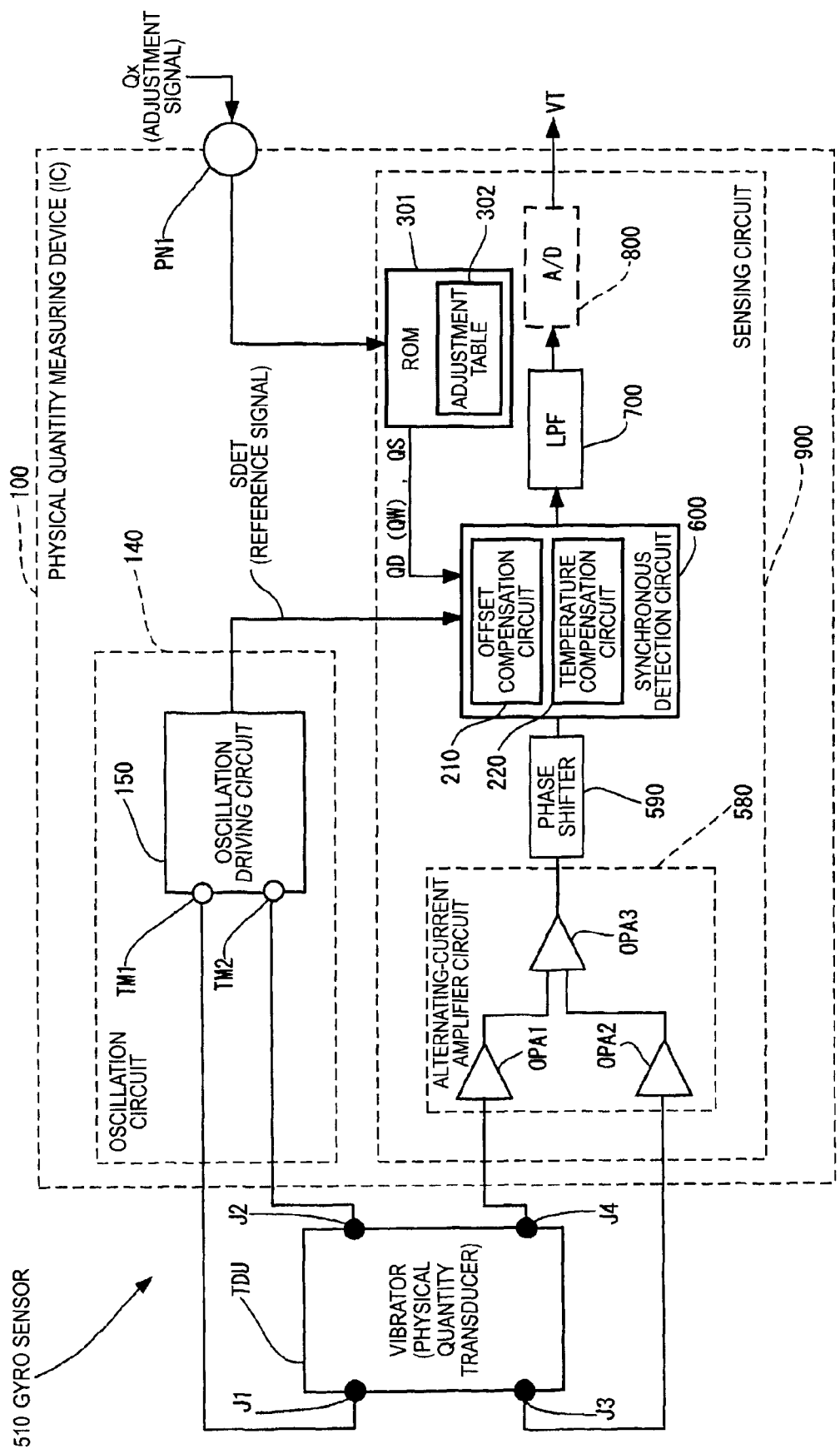
FIG. 8 is a diagram illustrating a configuration of a physical quantity measuring device and a gyro sensor.

FIG. 8 illustrates a configuration of a gyro sensor. A gyro sensor 510 includes a physical quantity measuring device (IC) 100, and a physical quantity transducer (a vibrator) TDU. The physical quantity measuring device (IC) 100 includes an oscillation circuit 140 having an oscillation driving circuit 150; and a sensing circuit 900. To two connecting terminals TM1 and TM2 of the oscillation driving circuit 150, a terminal J1 and a terminal J2 of the physical quantity transducer (the vibrator) TDU are respectively coupled. The oscillation driving circuit 150 outputs a synchronous detection reference signal SDET.

The sensing circuit 900 includes an alternating-current (AC) amplifier circuit 580, a phase shifter 590, a synchronous detection circuit 600, a low pass filer (LPF) 700, and a ROM 301 in which an adjustment table 302 is built. If required, an A/D converter circuit 800 is provided.

The AC amplifier circuit 580 includes current/voltage converting type amplifiers OPA1 and OPA2, and a differential amplifier OPA3. The current/voltage converting type amplifiers OPA1 and OPA2 amplify physical quantity signals (namely, input signals Vin) respectively outputted from a terminal J3 and a terminal J4 of the physical quantity transducer (the vibrator) TDU. The phase shifter 590 adjusts a phase of a signal outputted from the AC amplifier circuit 580.

As described above, the synchronous detection circuit 600 includes the offset compensation circuit 210, and the temperature compensation circuit 220. The synchronous detection circuit 600 operates as the above description. A voltage level of the offset compensation signal Voffm outputted from the offset compensation circuit 210 is controlled by correction data QD from the ROM 301 (compensation data for adjusting the resistance value of the R2R ladder circuit shown in FIG. 4), or a resistance value adjustment signal QW (an adjustment signal for adjusting the resistance value of the feedback resistor R40 in the circuit shown in FIG. 6).

A voltage level of the temperature compensation signal VTS outputted from the temperature compensation circuit 220 is controlled by a resistance value adjustment signal QS outputted from the ROM 301 (an adjustment signal for adjusting the resistance value of the variable gain amplifier AMP3 shown in FIG. 7).

Figure 9:
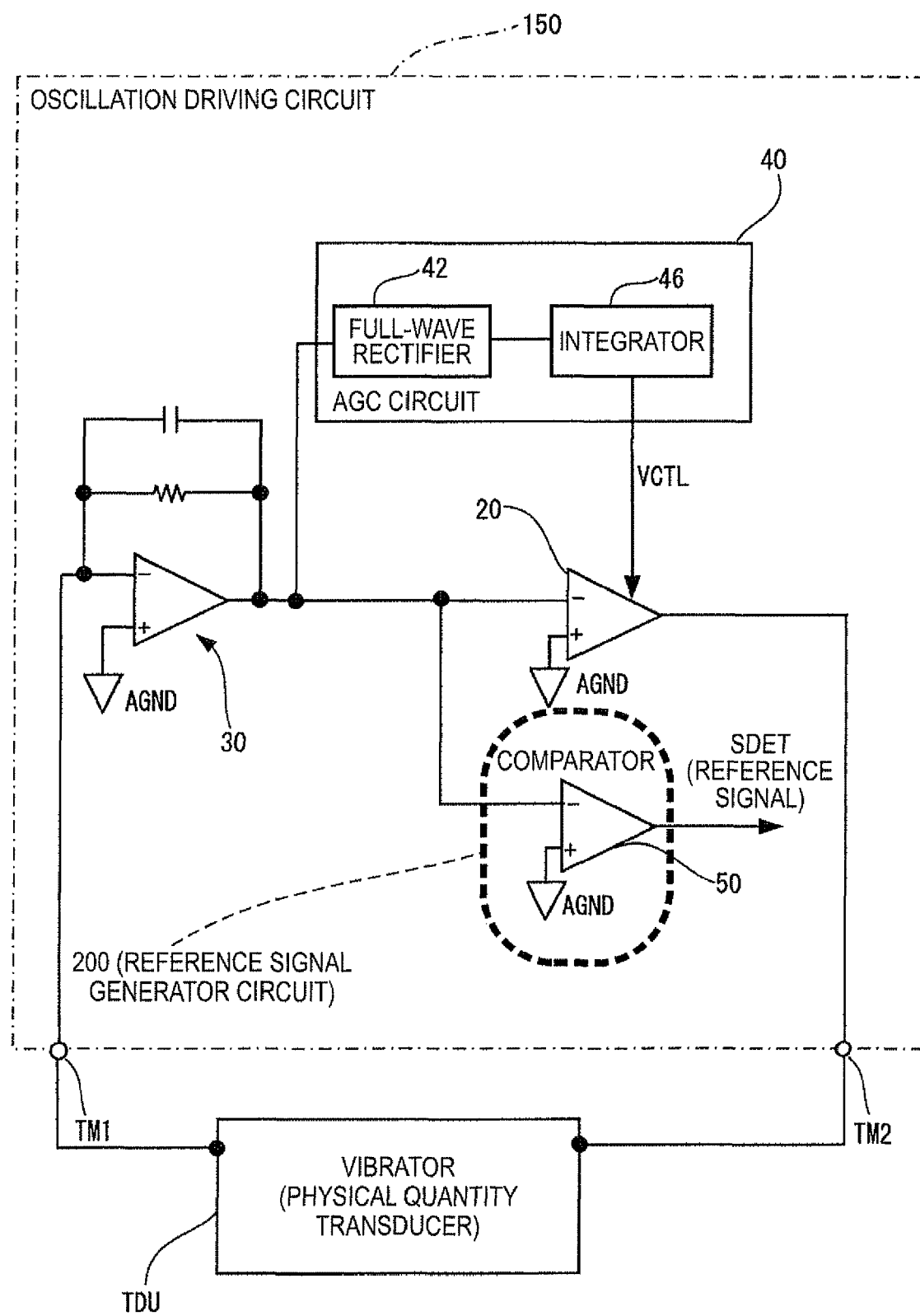
FIG. 9 is a diagram illustrating a configuration of an oscillation driving circuit.

FIG. 9 illustrates a configuration of the oscillation driving circuit shown in FIG. 8. To the connection terminals TM1 and TM2 of the oscillation driving circuit 150, the physical quantity transducer (the vibrator) TDU is coupled. The oscillation driving circuit 150 and the physical quantity transducer (the vibrator) TDU constitute an oscillation loop.

The oscillation driving circuit 150 is provided with a first stage amplifier 30, a variable gain amplifier 20, an AGC circuit 40, and a comparator 50 serving as a reference signal generator circuit 200. The comparator 50 generates a reference signal SDET for synchronous detection. The reference signal SDET is supplied to the synchronous detection circuit 600 (refer to FIGS. 1 and 2). The AGC circuit 40 includes a full-wave rectifier 42 and an integrator 46. A gain of the variable gain amplifier 20 is controlled by a gain controlling signal VCTL outputted from the integrator 46.

Third Embodiment

Figure 10:
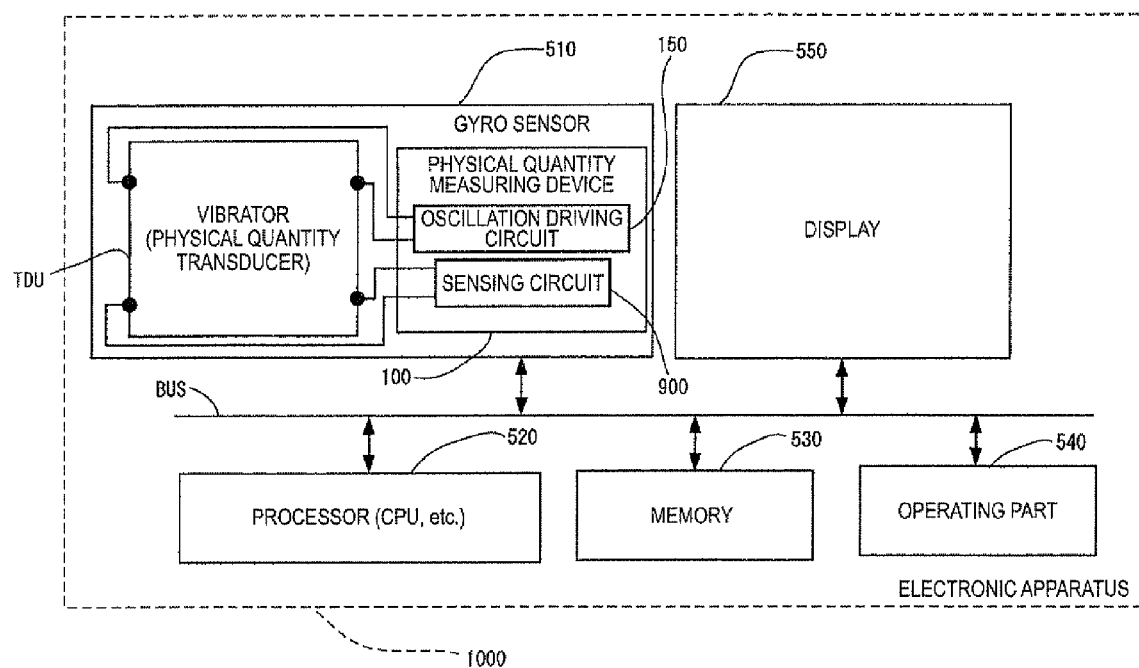
FIG. 10 is a diagram illustrating a configuration of an electronic apparatus.

In a third embodiment, an example of an electronic apparatus including the physical quantity measuring device of the invention will be described. FIG. 10 illustrates a configuration of an electronic apparatus including the physical quantity measuring device of the invention.

An electronic apparatus (a digital camera, for example) 1000 shown in FIG. 10 includes the gyro sensor (the physical quantity measuring device) 510, a display 550, a processor 520 such as a CPU, a memory 530, and an operating part 540. The gyro sensor 510 includes the physical quantity measuring device (IC) 100. The physical quantity measuring device 100 is provided with the oscillation driving circuit 150 and the sensing circuit 900. Further, to the physical quantity measuring device 100, the physical quantity transducer (the vibrator) TDU is coupled.

The sensing circuit 900 of the physical quantity measuring device 100 can cancel an offset voltage and temperature offset with high accuracy as described above. Therefore, the gyro sensor 510 to which the physical quantity transducer TDU is coupled exhibits high detecting-performance. In the same manner, the electronic apparatus 1000 that includes the gyro sensor 510 of the invention can detect physical quantity with high accuracy. Thus, provision of the gyro sensor 510 of the invention improves the performance of the electronic apparatus 1000. The electronic apparatus 1000 is not limited to the digital camera but may be a car navigation system, an air carrier, or a robot.

According to the embodiments described above, the following advantageous effects can be obtained, for example. However, it should be noted that the following advantageous effects are not always obtained all at once, and they do not limit the technical scope of the invention.

1. Variation, which is caused by the temperature, of the voltage level of the analog reference voltage (a direct current bias voltage) on the signal transmission path (or a circuit) can be compensated with high accuracy. Temperature compensation with low noise and high accuracy with respect to the analog reference voltage can be realized. That is, variation of the voltage level of the analog reference voltage (AGND) with respect to an ambient temperature can be compensated in circuit-wise (automatically) with high accuracy.

2. A temperature compensation circuit having high flexibility can be realized. The temperature compensation circuit can flexibly respond to various demands of various circuits.

3. The temperature compensation circuit according to the embodiments of the invention has a simplified configuration so as to be suitable for a manufacture of a high integrated IC.

4. A synchronous detection circuit capable of temperature compensation with high accuracy can be realized. Therefore, a synchronous detection circuit having substantially high detection sensitivity is realized.

5. A circuit (a band gap circuit, for example) for generating a voltage independent of the temperature is not required as a circuit of an AGND voltage source. Therefore, a circuit configuration of the whole IC is simplified.

6. Due to provision of a memory circuit (e.g., a nonvolatile memory such as an EPROM) that stores adjustment data for offset-canceling in the IC, canceling processing of an offset voltage can be automated by using the look up table method, for example.

7. A physical quantity measuring device that is capable of measuring physical quantity with substantially high accuracy based on a minute physical-quantity signal is realized.

8. A gyro sensor that is capable of detecting physical quantity with high accuracy (high sensitivity) based on a signal outputted from a vibrator is realized.

9. Based on a measuring result by the physical quantity measuring device, an operation of an electronic apparatus can be controlled or the measuring result can be displayed on a display screen of the electronic apparatus, for example. Since the physical quantity measurement is realized with high accuracy, a performance of the electronic apparatus is also improved.

10. The synchronous detection circuit can be used as a detection circuit for a communication signal as well as the sensing circuit for measuring physical quantity. In this case, the synchronous detection circuit operates as a quadrature detection circuit (or a mixer circuit performing frequency conversion). A carrier wave can be used as a reference signal, for example.

It should be understood that the present invention is not limited to the above describe embodiments and various modifications can be made without departing from the novelty and advantageous effects of the invention. Accordingly, all of such modifications are to be regarded to be in the scope of the invention. For examples though the synchronous detection circuit is described in the above description, the circuit may be called a mixer in a communication area. That is, the synchronous detection circuit can be considered as a mixer because the circuit has a function of converting alternating current into direct current (performs frequency conversion). The synchronous detection circuit can be realized with a circuit structure of a single balanced mixer or a double balanced mixer.

The present invention realizes temperature compensation with low noise and high accuracy with respect to a reference voltage on a signal path (or a circuit) and is useful as a temperature compensation circuit with high accuracy and low noise.

What is claimed is:

1. A temperature compensation circuit performing temperature compensation of an analog reference voltage, comprising:
a first reference voltage generating circuit generating a first voltage of which a voltage level varies depending on a temperature;
a second reference voltage generating circuit generating a second voltage of which a voltage level is independent of a temperature and having a circuit configuration that is same as a circuit configuration of the first reference voltage generating circuit;

an inverting amplifier having a gain of 1, the inverting amplifier inverting and amplifying a voltage difference between the first voltage and the second voltage so as to generate a third voltage; and a differential amplifier amplifying a voltage difference between the third voltage and the first voltage so as to generate a fourth voltage, the differential amplifier including:

a first operational amplifier;

a first resistor coupled between a first node and a second node that is an inverting input terminal of the first operational amplifier;

a second resistor coupled between a third node and a fourth node that is a non-inverting input terminal of the first operational amplifier;

a third resistor coupled between the second node and a fifth node that is an output node of the first operational amplifier; and a fourth resistor coupled between the fourth node and a sixth node to which an analog reference voltage is applied, resistance values of the first resistor and the second resistor are set to be same as each other, and resistance values of the third resistor and the fourth resistor are set to be same as each other.

2. The temperature compensation circuit of claim 1, the first reference voltage generating circuit and the second reference voltage generating circuit being respectively composed of a first band gap circuit and a second band gap circuit that have a same circuit configuration as each other except for resistance values of resistors used therein, and the first band gap circuit and the second band gap circuit are manufactured by a common manufacturing process so as to be disposed adjacent to each other.

3. The temperature compensation circuit of claim 1, further comprising:

a variable gain amplifier that is provided on a next stage of the differential amplifier and amplifies the fourth voltage so as to output a fifth voltage, the variable gain amplifier including:

a second operational amplifier;

a fifth resistor coupled between a seventh node and an eighth node that is an inverting input terminal of the second operational amplifier;

a sixth resistor coupled between a ninth node that is a non-inverting input terminal of the second operational amplifier and a tenth node to which the analog reference voltage is applied; and a seventh resistor coupled between the eighth node and an eleventh node that is an output node of the second operational amplifier, and at least one of the fifth resistor and the seventh resistor is a variable resistor of which a resistance value is variable.

4. The temperature compensation circuit of claim 3, further comprising:

a voltage adder that adds the fifth voltage, the fifth voltage being outputted from the variable gain amplifier, and the fourth voltage so as to output a sixth voltage.

5. The temperature compensation circuit of claim 4, the voltage adder including a first voltage adding resistor and a second voltage adding resistor, the first voltage adding resistor is coupled between the eleventh node to which the fifth voltage is applied and a twelfth node, and the second voltage adding resistor is coupled between the seventh node and the twelfth node.

6. A temperature compensation circuit that performs temperature compensation of an analog reference voltage, comprising:

a first reference voltage generating circuit that generates a first voltage of which a voltage level varies depending on a temperature;

a second reference voltage generating circuit generating a second voltage of which a voltage level is independent of the temperature;

an inverting amplifier having a gain of 1, the inverting amplifier inverting and amplifying a voltage difference between the first voltage and the second voltage so as to generate a third voltage that increases proportionally with the temperature; and a differential amplifier amplifying a voltage difference between the third voltage and the first voltage so as to generate a fourth voltage that is offset from the third voltage by a constant value, the first reference voltage generating circuit and the second reference voltage generating circuit being respectively composed of a first band gap circuit and a second band gap circuit that have a same circuit configuration as each other except for resistance values of resistors used therein.

7. The temperature compensation circuit of claim 6, further comprising:

a variable gain amplifier that amplifies the fourth voltage to produce a fifth voltage.

8. The temperature compensation circuit of claim 7, further comprising a voltage adder that adds the fifth voltage and the fourth voltage to produce a sixth voltage.

9. A method of temperature compensating an analog reference voltage, comprising:

generating a first voltage with a voltage level that varies based on a temperature;

generating a second voltage with a voltage level that that is independent of the temperature;

inverting and amplifying by a gain of 1 a voltage difference between the first voltage and the second voltage so as to generate a third voltage that increases proportionally with the temperature;

amplifying a voltage difference between the third voltage and the first voltage so as to generate a fourth voltage that is offset from the third voltage by a constant value;

amplifying the fourth voltage to produce a fifth voltage; and adding the fifth voltage and the fourth voltage to produce a sixth voltage.

* * * * *